(12) United States Patent
Hatono et al.

(10) Patent No.: US 6,562,936 B1
(45) Date of Patent: May 13, 2003

(54) APPARATUS AND METHOD FOR PRODUCING RESIN

(75) Inventors: Kazuki Hatono, Iwakuni (JP); Masumi Hirata, Iwakuni (JP); Hiroaki Kaneko, Iwakuni (JP); Toru Sawaki, Iwakuni (JP); Wataru Funakoshi, Iwakuni (JP); Katsushi Sasaki, Iwakuni (JP); Masasi Simonaru, Iwakuni (JP); Kouji Kiyoshige, Iwakuni (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/786,523

(22) PCT Filed: Jul. 6, 2000

(86) PCT No.: PCT/JP00/04522

§ 371 (c)(1),
(2), (4) Date: Jun. 11, 2001

(87) PCT Pub. No.: WO01/02467

PCT Pub. Date: Sep. 16, 1999

(30) Foreign Application Priority Data

| Jul. 6, 1999 | (JP) | 11-191505 |
| Sep. 8, 1999 | (JP) | 11-254221 |
| Sep. 9, 1999 | (JP) | 11-255705 |
| Sep. 16, 1999 | (JP) | 11-261777 |

(51) Int. Cl.$^7$ ............................................. C08G 64/00
(52) U.S. Cl. ....................................... 528/196; 528/198
(58) Field of Search .................................. 528/196, 198

(56) References Cited

U.S. PATENT DOCUMENTS

| 5,364,926 A | 11/1994 | Sakashita et al. ........... 528/198 |
| 5,502,153 A | 3/1996 | Sakashita et al. ........... 528/198 |
| 5,516,878 A | 5/1996 | Sasaki et al. ................ 528/199 |
| 5,525,701 A | 6/1996 | Tominari et al. ........... 528/199 |
| 5,696,222 A | 12/1997 | Kaneko et al. ............. 528/196 |
| 5,816,697 A | 10/1998 | Nogata et al. ............. 366/76.1 |
| 6,037,437 A | 3/2000 | Komiya et al. ............. 528/199 |

FOREIGN PATENT DOCUMENTS

| EP | 0 778 078 | 6/1996 | ............. B01F/3/10 |
| EP | 0 819 717 A1 | 1/1998 | ........... C08G/64/20 |
| JP | 53-56466 | 10/1951 | |
| JP | 61-206431 | 12/1986 | ........... B29C/47/76 |

(List continued on next page.)

OTHER PUBLICATIONS

Rufus et al., "Identification of Fluorescent Products by the Thermal Treatment of Bisphenol–A–Based Polycarbonate", Journal of Applied Polymer Science, vol. 51, pp. 1549–1558 (1994).

(List continued on next page.)

Primary Examiner—Terressa M. Boykin
(74) Attorney, Agent, or Firm—Sughrue Mion, PLLC

(57) ABSTRACT

A method of producing a polycarbonate or the like which is excellent in hydrolysis and heat stability such as a reduction in molecular weight at the time of molding and color retention and moldability such as releasability and transferability, rarely experiences residence deterioration such as coloring, crosslinking and gel formation and has an extremely small content of foreign matter by employing a special structure for an opening in the side surface of a horizontal cylindrical vacuum resin treating apparatus, supplying a molten polycarbonate into a unidirectional rotary intermeshing double-screw extruder under specific conditions, adding a specific agent under specific conditions and cleaning the inner surface of a production apparatus by a specific method.

29 Claims, 9 Drawing Sheets

FOREIGN PATENT DOCUMENTS

| | | | |
|---|---|---|---|
| JP | 778078 | 1/1987 | |
| JP | 62-19428 | 1/1987 | |
| JP | 5-9286 | 1/1993 | ........... C08G/64/20 |
| JP | 5-239334 | 9/1993 | ........... C08L/69/00 |
| JP | 6-56984 | 3/1994 | ........... C08G/64/30 |
| JP | 6-200008 | 7/1994 | ........... C08G/64/30 |
| JP | 6-234845 | 8/1994 | ........... C08G/64/30 |
| JP | 7-268091 | 10/1995 | ........... C08G/64/30 |
| JP | 8-59975 | 3/1996 | ........... C08L/69/00 |
| JP | 8-277327 | 10/1996 | ........... C08G/64/30 |
| JP | 9-59367 | 3/1997 | |
| JP | 9-241370 | 9/1997 | ........... C08G/64/20 |
| JP | 10-36497 | 2/1998 | ........... C08G/64/14 |
| JP | 10-226723 | 8/1998 | ........... C08G/64/04 |
| JP | 10-237171 | 9/1998 | |
| JP | 10-292050 | 11/1998 | |
| JP | 10-298301 | 11/1998 | |

OTHER PUBLICATIONS

Microfilm of the specification and drawings first annexed to the request of Japanese Utility Model Application No. 89832/1985 (Laid–open No.206431/1986) (Toshiba Machine Co., Ltd.) Dec. 26, 1986, Claims of Utility Model; p. 4, lines 4–10; Fig. 1 (Family:none).

Microfilm of the specification and drawings first annexed to the request of Japanese Utility Model Application No. 139875/1976 (Laid–open No. 56466/1978) (Mitsubishi Monsanto Kasei K.K.) May 15, 1978, Claims of Utility Model; p. 7, line 4–7; Figs. 5 (Family: none).

F I G. 5
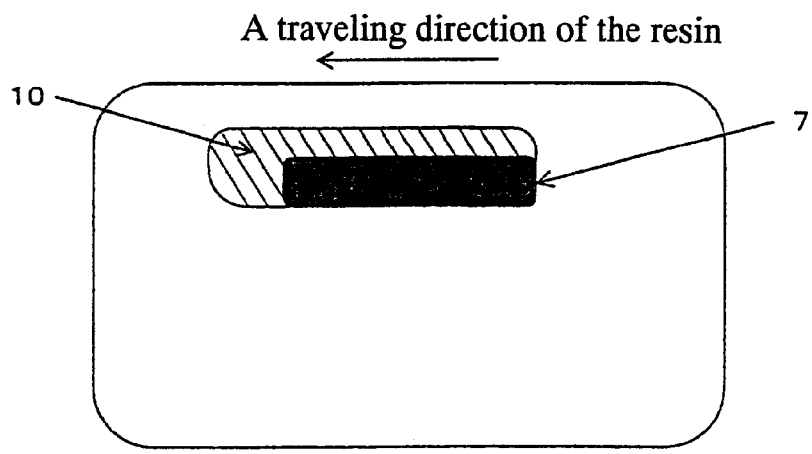
F I G. 6
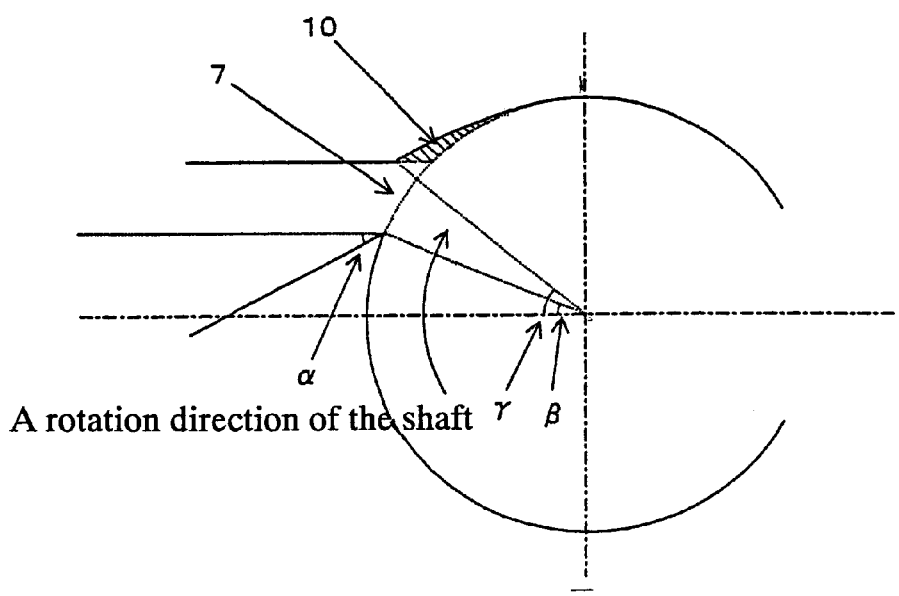

FIG. 7—(a)  Spindle-shaped plate
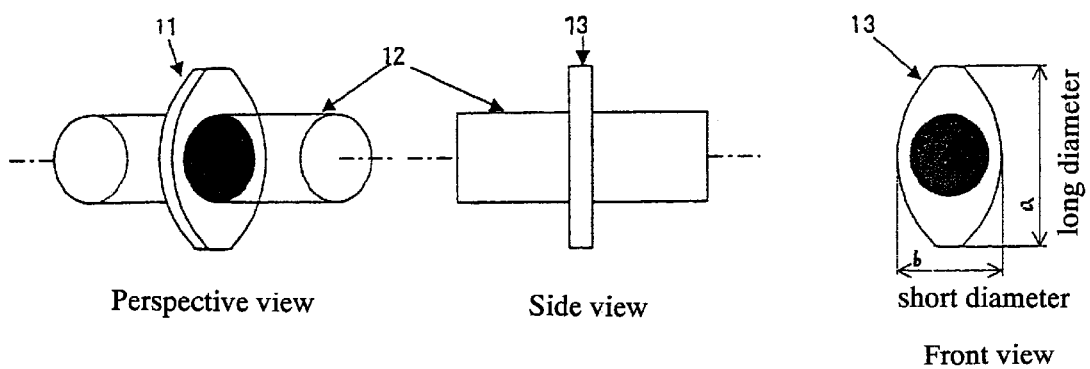
Perspective view      Side view      short diameter
                                     Front view
FIG. 7—(b)  Back kneading unit
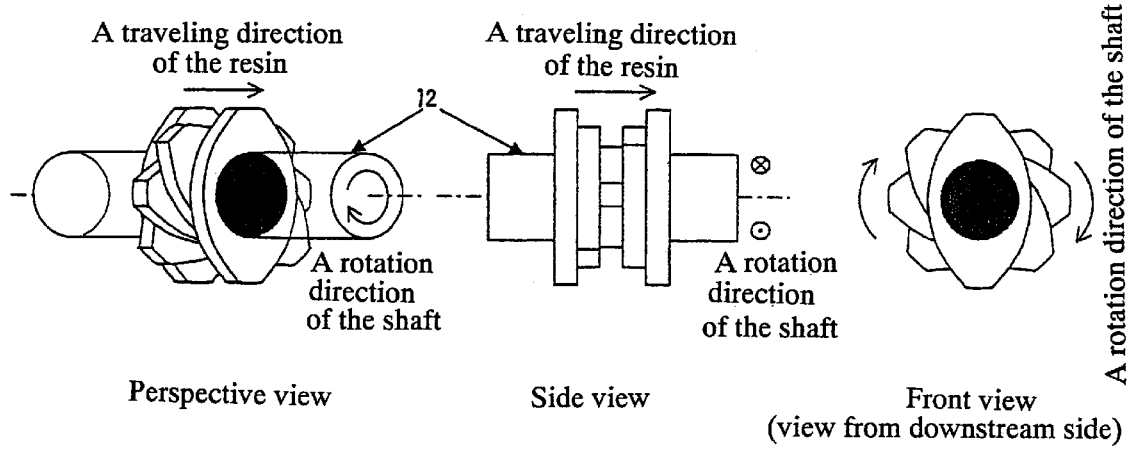
Perspective view      Side view      Front view
                                     (view from downstream side)

FIG. 7 — (c)  Forward kneading unit
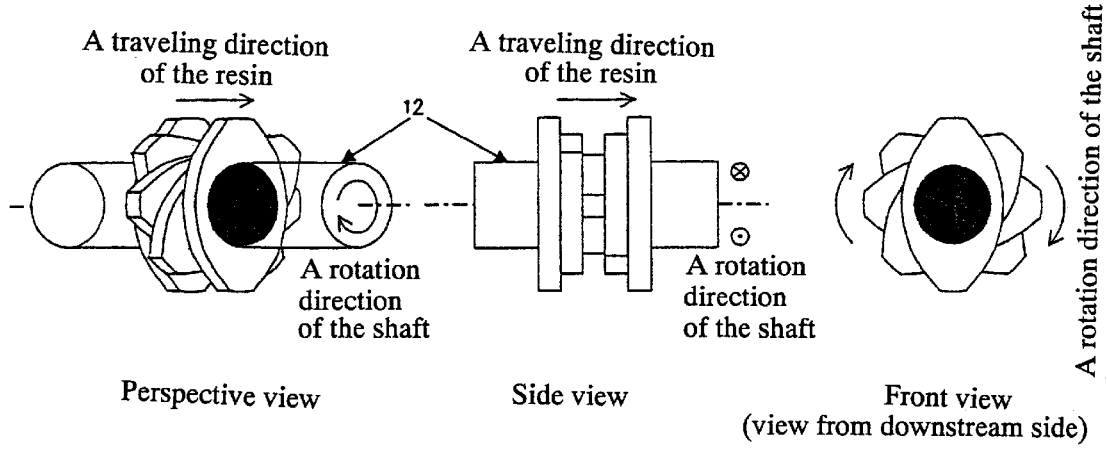
FIG. 7 — (d)  Neutral kneading unit
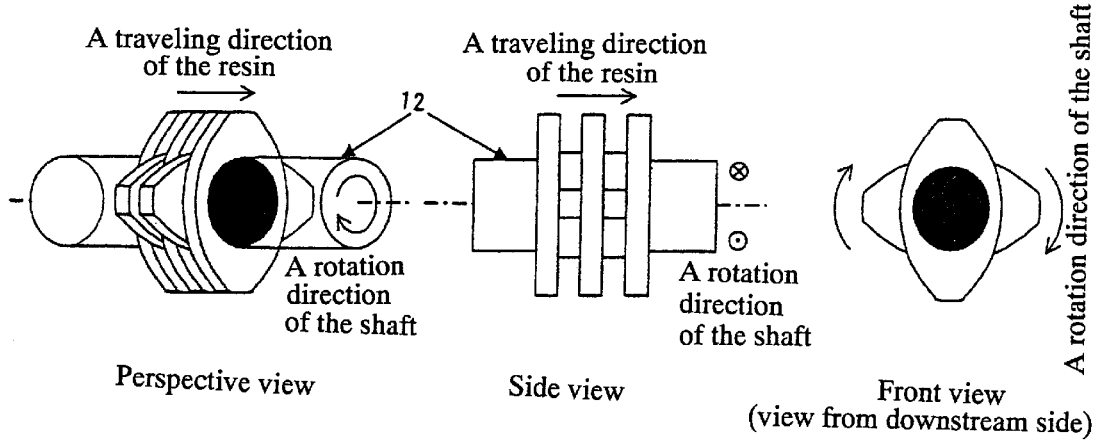

FIG. 7 – (e)    Sealing unit
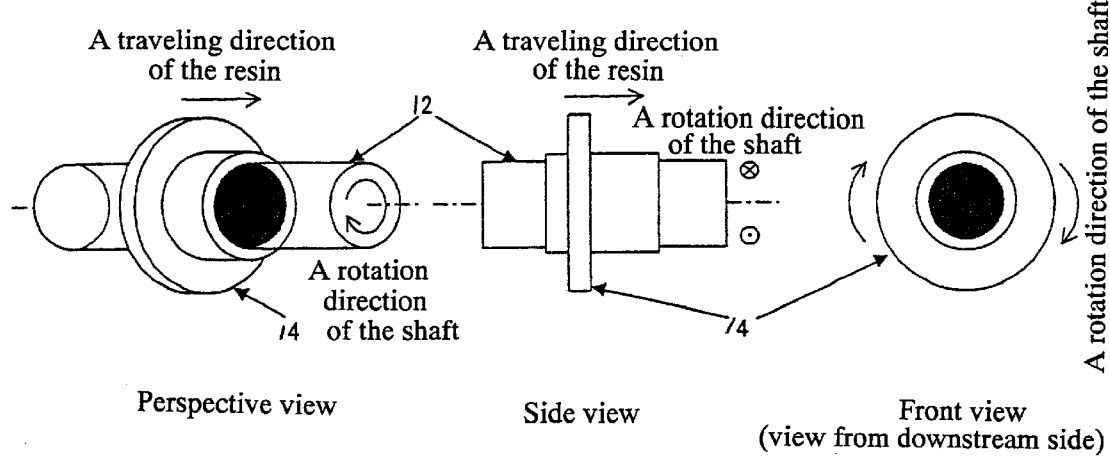
FIG. 7 – (f)    Full flight unit
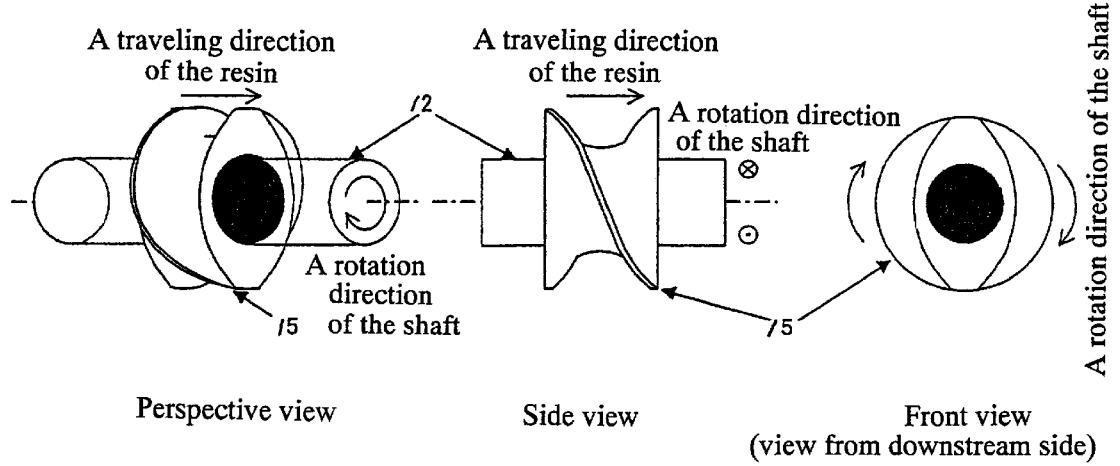

FIG. 7 — (g)    Back flight unit
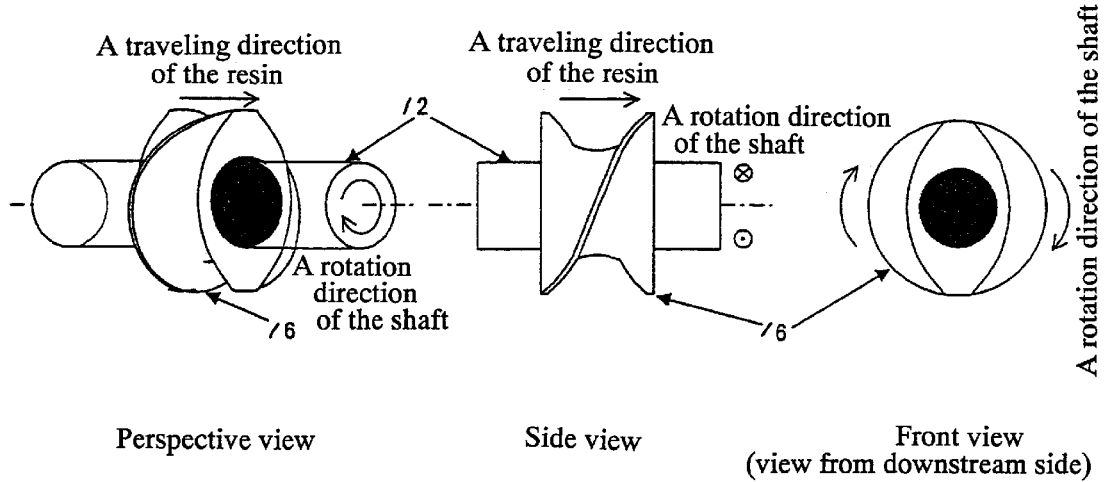

FIG. 8 — (a)
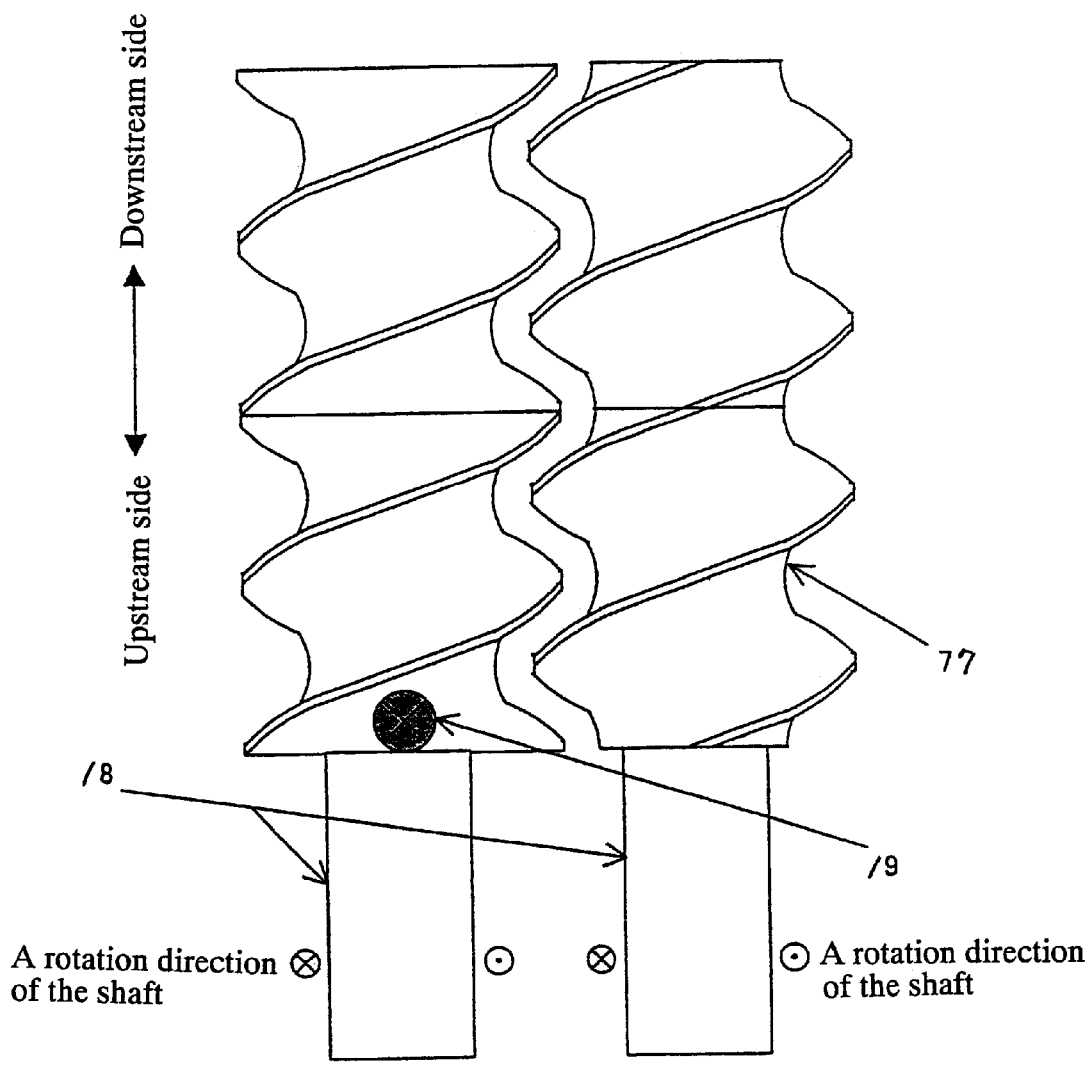
Diagram explaining polycarbonate supply position

FIG. 8-(b)
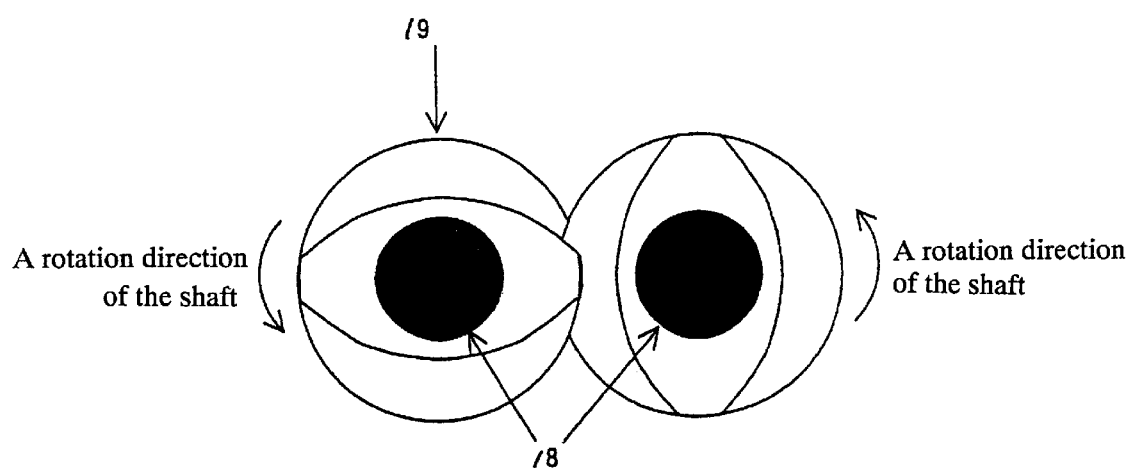

APPARATUS AND METHOD FOR PRODUCING RESIN

FIELD OF THE INVENTION

The present invention relates to the production of a polycarbonate or the like and, more specifically, to the production of a polycarbonate or the like which is excellent in color, hydrolysis resistance, heat stability such as a reduction in molecular weight at the time of molding and color retention, and moldability such as releasability and transferability, rarely experiences residence deterioration such as coloring, crosslinking and gel formation, and has an extremely low content of foreign matter.

PRIOR ART

Polycarbonates are widely used in mechanical parts, optical moldings and auto parts, thanks to their excellent mechanical properties such as impact resistance, heat resistance and transparency.

The polycarbonates have recently been in great demand as optical moldings and widely used in optical disks, information disks, optical lenses, prisms and the like. Along with this, higher stability, releasability and transferability have been required of the polycarbonates.

Particularly, a polycarbonate having bisphenol A(2,2-bis (4-hydroxyphenyl)propane) as a recurring unit has recently been in increasingly demand mainly from optical media such as compact disks and CD-ROMs.

This polycarbonate is produced by directly reacting an aromatic dihydroxy compound (also called "aromatic diol") such as bisphenol and phosgene (interfacial method) or by carrying out an ester exchange reaction between an aromatic dihydroxy compound and a carbonic acid diester (melting method).

Out of these, the latter method has such an advantage that the polycarbonate can be produced at a lower cost than the former interfacial method and is preferred from the viewpoint of environmental sanitation because a toxic substance such as phosgene is not used.

The polycarbonate obtained from a polycondensation reaction is generally treated by an intermeshing double-screw extruder. Particularly when the polycarbonate is supplied into an intermeshing double-screw extruder in a molten state to be treated, the coloring and crosslinking of the polycarbonate and the formation of a gel occur during this treatment and the content of foreign matter in the polycarbonate increases, thereby exerting a great influence upon the quality of a final product.

This problem is a general problem for polycarbonates. According to studies conducted by the present inventors, it has been found that this problem becomes marked particularly when a phosphorus-based compound is used as an additive to improve heat resistance or when a fatty acid ester is used as an additive to improve releasability in addition to the phosphorus-based compound.

According to studies conducted by the present inventors, it has also been found that the above problem tends to be marked when the devolatilization of a polycarbonate is carried out using water as a devolatilizing agent.

This problem is serious especially in the case of polycarbonates which have recently been used for optical application which requires high density and high accuracy, such as DVD, MO and CDR because coloring and gel formation exert a direct influence upon the optical properties such as block error rate and mechanical properties such as tension, bending and rigidity of a final product.

A polycarbonate obtained from a polycondensation reaction is generally pelletized, divided into small lots according to use purpose, remolten, mixed with additives for certain purposes and colored. A conventional polycarbonate may lack residence stability as it may be colored or its molecular weight may decrease at the time of melting. Therefore, when polycarbonate pellets are to be remolten, a heat resistant stabilizer or the like is added to improve heat stability. However, in this method, the polycarbonate is heated while it has low heat stability.

Since the water resistance of the polycarbonate may be lowered by the addition of the above heat resistant stabilizer, a molded product obtained from the polycarbonate may deteriorate in transparency during use.

JP-A 5-009286 (the term "JP-A" as used herein means an "unexamined published Japanese patent applications") discloses a method of producing a polycarbonate by adding a phosphorus-based compound and/or a sulfur-containing acidic compound while the polycarbonate obtained from a melt polycondensation reaction is molten.

However, the publication fails to disclose a method of adding a phosphorus-based compound and/or a sulfur-containing acidic compound to the polycarbonate in a molten state and involves a problem to be solved for the continuous production of a polycarbonate having desired quality.

The above publication uses a sulfur-containing acidic compound as a catalyst neutralizer. The sulfur-containing acidic compound is added to the remaining catalyst excessively, specifically 2 times or more the molar amount of the catalyst, whereby the residual catalyst is neutralized and stabilized but an excess of the sulfur-containing acidic compound remains in the obtained polycarbonate. As a result, it cannot be said that the water resistance of the obtained polycarbonate is satisfactory, and the sulfur-containing acidic compound corrodes an aluminum film deposited on an optical disk molded product.

Therefore, the development of a polycarbonate continuous production method capable of stably producing a polycarbonate which is excellent in color and hydrolysis resistance as well as heat stability such as a reduction in molecular weight at the time of molding and color retention, and moldability such as releasability and transferability has been desired.

As for a method of producing a polycarbonate having excellent color and a low content of foreign matter by an ester exchange method, methods employing a pretreated reactor used for the production of a polymer have already been disclosed.

For example, JP-A 6-200008 discloses a method in which a reactor is cleaned with a phenol-based compound after the end of a reaction.

JP-A 6-56984 discloses a method in which polymerization is carried out after a stainless steel reactor is cleaned with a solution containing an aromatic hydroxy compound.

JP-A 9-241370 discloses a method in which a high-molecular weight polycarbonate having excellent color is obtained from a material containing substantially no FeOOH, CrOOH and NiOOH components present on the surface of a liquid contact portion. JP-A 8-277327 discloses a method in which the stainless steel of a liquid contact portion is heated.

However, all of the above publications fail to disclose or suggest a cleaning method disclosed by the present invention. The reduction of the number of foreign substances disclosed by the present invention is not taken into account in any of the above publications.

A polycarbonate for use in optical disks has recently been required to have a small error rate along with an increase in the recording density of the optical disks. A polymer having a reduced number of foreign substances which cause an error has been desired as the polycarbonate which meets the demand.

To obtain a polycarbonate having a reduced number of foreign substances, JP-A 5-239334 teaches a method of producing an optical polycarbonate having an extremely low content of foreign substances by melt polycondensing an aromatic hydroxy compound and a carbonic acid diester in the presence of a catalyst, adding and kneading additives and filtering the resulting product with a polymer filter.

JP-A 6-234845 discloses a method in which at least one filter is installed before and at the exit of the final reactor. However, the number of foreign substances formed during a reaction cannot be reduced by these methods.

JP-A 10-226723 teaches a method of obtaining a polycarbonate which is little colored and contains a small amount of fine foreign substances by transferring a polymer during or after polymerization through a pipe, wherein the flow rate of the polymer is 0.05 m/sec or more when the number average molecular weight of the molten polymer is less than 2,500 and 0.005 m/sec or more when the number average molecular weight of the molten polymer is 2,500 or more. All of the methods are still unsatisfactory as a basic solution to the above problem.

SUMMARY OF THE INVENTION

The present invention relates to the production of a polycarbonate or the like and, more specifically, to the production of a polycarbonate or the like which is excellent in color, hydrolysis resistance, heat stability such as a reduction in molecular weight at the time of molding and color retention, and moldability such as releasability and transferability, rarely experiences residence deterioration such as coloring, crosslinking and gel formation, and has an extremely low content of foreign matter.

The present invention is suitable for the continuous production of a polycarbonate or the like having the above characteristic properties.

The above characteristic properties are closely related to one another and technical factors which have an influence upon these characteristic properties are entangled with one another. Therefore, it has been found that a certain technical factor must be optimized to optimize a certain characteristic property and technologies which take influences upon these characteristic properties into careful consideration must be combined to optimize these characteristic properties.

The above problem is common to other resins which readily experience coloring, crosslinking, foreign matter, gel formation and decomposition and the present invention can be applied to resins other than polycarbonates.

The present invention is as follows.

That is, the present invention relates to a method of producing a general resin, particularly a polycarbonate, by improving the structure of a horizontal cylindrical vacuum resin treating apparatus and, more specifically, to a production apparatus and method for the production of a resin having an extremely low content of foreign matter, which do not cause residence deterioration such as coloring, crosslinking and gel formation and which are suitable for a polycarbonate obtained by a melt polymerization method.

A polycarbonate having a marked effect of the present invention which relates to the structure of a horizontal cylindrical vacuum resin treating apparatus will be described hereinafter. The following present invention can be applied to other resins which readily experience coloring, crosslinking, foreign matter and gel formation.

1. A resin production apparatus in which an opening is formed in the side surface of a horizontal cylindrical vacuum resin treating apparatus and at least the lower portion of a vacuum suction pipe connected to the opening has a falling gradient with respect to the opening.
2. The production apparatus of the above paragraph 1, wherein the angle of the falling gradient from the horizontal plane is between 5° and 45°.
3. The production apparatus of the above paragraph 1 or 2, wherein the opening is formed in the side surface of a horizontal cylindrical vacuum resin treating apparatus such that the angle formed by a line connecting the center of the treating apparatus and the lowest position of the opening and a horizontal line passing through the center of the treating apparatus is located above the horizontal plane and between 0° and 85° and the angle formed by a line connecting the center of the treating apparatus and the highest position of the opening and a horizontal line passing through the center of the treating apparatus is located above the horizontal plane and between 5° to 90° within a section perpendicular to the axial direction of the treating apparatus.
4. The production apparatus of any one of the above paragraphs 1 to 3, wherein when the rotation of a rotor blade is observed from the outside in the opening formed in the side surface of a horizontal cylindrical vacuum resin treating apparatus, the rotation direction of a rotating shaft is selected such that the rotor blade rotates from the bottom to the top.
5. The production apparatus of any one of the above paragraphs 1 to 4, wherein part or all of the vacuum suction pipe is heated at a temperature at which the melt viscosity of the treated resin adhered to the vacuum suction pipe should become 5,000 Pa·s or less.
6. The production apparatus of any one of the above paragraphs 1 to 5, wherein the horizontal cylindrical vacuum resin treating apparatus is an extruder.
7. The production apparatus of any one of the above paragraphs 1 to 6, wherein the horizontal cylindrical vacuum resin treating apparatus is an intermeshing double-screw extruder.
8. The production apparatus of any one of the above paragraphs 1 to 7, wherein the treatment of the horizontal cylindrical vacuum resin treating apparatus is the removal of volatile matter contained in a resin and/or the addition and mixing of an additive.
9. The production apparatus of the above paragraph 8, wherein the resin is a polycarbonate.
10. The production apparatus of the above paragraph 8 or 9, wherein the additive is a phosphorus-based compound.
11. The resin apparatus of the above paragraph 8 or 9, wherein the additive is a fatty acid ester.
12. The production apparatus of the above paragraph 8 or 9, wherein the removal of volatile matter is carried out by adding and kneading water with the resin and sucking the volatile matter under reduced pressure.
13. A polycarbonate production method using the production apparatus of the above paragraphs 1 to 12.
14. The production method of the above paragraph 13, wherein volatile matter is removed by adding and kneading 0.1 to 20 wt % of water based on the molten polycarbonate at a temperature of 200 to 350° C. and a pressure of 0.3 MPa or more and sucking the volatile matter at a vent section pressure of $1.013 \times 10^5$ Pa (760 mmHg) or less.

15. The production method of the above paragraph 13 or 14, wherein a polycarbonate obtained by melt polymerizing an aromatic dihydroxy compound and an aromatic carbonic acid diester is supplied into an extruder without being solidified.

The present invention relates to a method of producing a polycarbonate by improving conditions when the polycarbonate is treated by a unidirectional rotary intermeshing double-screw extruder and, particularly, to the production of a polycarbonate which does not cause residence deterioration such as coloring, crosslinking, crystallized product and gel formation, and has an extremely low content of foreign matter by a melt polymerization method. The present invention is as follows.

16. A polycarbonate production method in which a molten polycarbonate is supplied into a unidirectional rotary intermeshing double-screw extruder at the following position:
   1) the upper portion of one of the screws of the double-screw extruder having such a rotation direction that the supplied polycarbonate is first moved toward the side wall of a cylinder and
   2) a position adjacent to the end of a shaft.

17. The production method of the above paragraph 16, wherein the shaft sealing portion of the screw shaft of the extruder is made from a material having a heat resistance of 250° C. or more, 18. The production method of the above paragraph 16 or 17, wherein the agitation unit of a portion where the molten polycarbonate is supplied is a full flight unit.

19. The production method of the above paragraph 16 or 17, wherein the number of agitation units of a portion where the molten polycarbonate is supplied is one or more and a forward kneading unit is arranged on the shaft end side.

20. The production method of the above paragraph 16 or 17, wherein the number of agitation units of a portion where the molten polycarbonate is supplied is one or more, and a back kneading unit is arranged on the shaft end side.

21. The production method of the above paragraph 16 or 17, wherein the number of agitation units of a portion where the molten polycarbonate is supplied is one or more, and a neutral kneading unit is arranged on the shaft end side.

22. The production method of any one of the above paragraphs 16 to 21, wherein the molten polycarbonate obtained by melt polymerizing an aromatic dihydroxy compound and an aromatic carbonic acid diester is supplied into the extruder without being solidified.

The present invention mainly relates to a polycarbonate continuous production method capable of stably producing a polycarbonate which is excellent in color, hydrolysis resistance as well as heat stability such as a reduction in molecular weight at the time of molding and color retention, and moldability such as releasability and transferability by improving a method of adding various agents. The present invention is as follows.

23. A polycarbonate continuous production method comprising the steps of:
   melt polycondensing an aromatic dihydroxy compound and 1.00 to 1.1 mol of a carbonic acid diester based on 1 mol of the aromatic dihydroxy compound in the presence of $10^{-8}$ to $5 \times 10^{-5}$ equivalent of an alkali metal and/or alkali earth metal compound based on 1 mol of the aromatic dihydroxy compound; and
   adding [A] 0.00001 to 0.01 part by weight of a sulfonic acid compound represented by the following formula (1):

$$A^1-SO_3X^1 \qquad (1)$$

wherein $A^1$ is a hydrocarbon group having 1 to 20 carbon atoms which may have a substituent, and $X^1$ is an ammonium cation or phosphonium cation, and/or [B] 0.0001 to 0.1 part by weight of a phosphorus-based compound and/or [C] 0.0005 to 0.3 part by weight of a partial ester of an aliphatic carboxylic acid and a polyhydric alcohol based on 100 parts by weight of the polycarbonate which is the reaction product as a mixture or separate liquid products to a double-screw extruder at the same time or separately while the polycarbonate is molten, wherein the liquid products are added to the pressurized portions of the double-screw extruder.

24. The polycarbonate continuos production method of the above paragraph 23, wherein the liquid products are added under the condition that the pressure of any one of the portions to which the liquid products are added of the double-screw extruder is 2 MPa (2 kg/cm$^2$) or more.

25. The polycarbonate continuous production method of the above paragraph 23 or 24, wherein any one of the addition portions of the double-screw extruder has a resin filling rate of 50% or more.

26. The polycarbonate continuous production method of the above paragraph 23 or 24, wherein the double-screw extruder is a multi-stage vented double-screw extruder and has at least one unit treating zone consisting of a kneading section, sealing section and depressurizing section, and the liquid products are added to at least one of the kneading sections.

27. The polycarbonate continuous production method of any one of the above paragraphs 23 to 26, wherein the sulfonic acid compound is a sulfonic acid phosphonium salt represented by the following formula (1)-1:

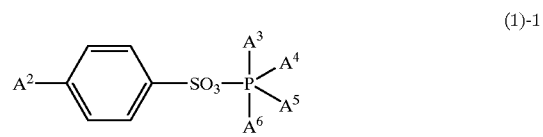

wherein $A^2$, $A^3$, $A^4$, $A^5$ and $A^6$ are each independently a monovalent hydrocarbon group having 1 to 20 carbon atoms.

28. The polycarbonate continuous production method of any one of the above paragraphs 23 to 27, wherein an aromatic phosphorous acid ester compound is used as the phosphorus-based compound.

29. The polycarbonate continuous production method of any one of the above paragraphs 23 to 28, wherein a melt polycondensation reaction is carried out in the presence of $1 \times 10^{-5}$ to $5 \times 10^{-3}$ equivalent of a nitrogen-containing basic compound based on 1 mol of an aromatic dihydroxy compound together with an alkali metal and/or alkali earth metal compound.

Further, the present invention which is based on the finding that the color of the produced polycarbonate can be improved and foreign matter can be suppressed by using a sulfur compound for the cleaning of a polycarbonate production apparatus is as follows.

Since it is considered that color deterioration and the formation of foreign matter are greatly related to the deterioration of a polymer component though its mechanism is unknown, it is estimated that substances which cause color deterioration and the formation of foreign matter and are adhered to the inner surface of the apparatus in some form are removed. Unexpectedly, a long-lasting effect is obtained by one time of cleaning.

30. A polycarbonate production method using an apparatus whose inner surface is partially or wholly cleaned with a cleaning fluid containing a sulfur compound.
31. The production method of the above paragraph 30, wherein the sulfur compound is at least one member selected from the group consisting of thiols, thioethers, thiocyanates, isothiocyanates, thioesters, thioureas, thiocarbonates and disulfides.
32. The production method of the above paragraph 30 or 31, wherein the polycarbonate is produced from an ester exchange reaction between an aromatic dihydroxy compound and a carbonic acid diester compound in the presence of a catalyst.
33. The production method of any one of the above paragraphs 30 to 32, wherein the apparatus includes a reactor having a stainless steel inner surface.

A description is first given of the polycondensation of a polycarbonate.

In the present invention, the polycarbonate is a polycondensate of an aromatic dihydroxy compound and a carbonate bond forming compound.

The aromatic dihydroxy compound is preferably a compound represented by the following general formula (2):

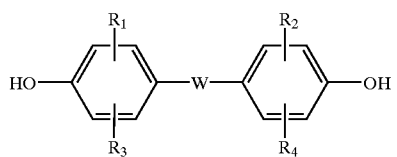

(2)

wherein $R_1$, $R_2$, $R_3$ and $R_4$ are independently a hydrogen atom, alkyl group having 12 or less carbon atoms, aralkyl group, aryl group or halogen atom, and W is an alkylidene group having 30 or less carbon atoms, alkylene group, cycloalkylidene group, cycloalkylene group, phenyl group-substituted alkylene group, oxygen atom, sulfur atom, sulfoxide group, sulfone group or direct bond.

Illustrative examples of the aromatic dihydroxy compound include bis(4-hydroxyaryl)alkanes such as bis(4-hydroxyphenyl)methane, 2,2-bis(4-hydroxyphenyl)propane, 1,1-bis(4-hydroxyphenyl)ethane, 2,2-bis(4-hydroxy-3-methylphenyl)propane, 2,2-bis(4-hydroxyphenyl)heptane, 2,2-bis(4-hydroxy-3,5-dichlorophenyl)propane, 2,2-bis(4-hydroxy-3,5-dibromophenyl)propane, bis(4-hydroxyphenyl)phenylmethane, 4,4-dihydroxyphenyl-1,1'-m-diisopropylbenzene and 4,4-dihydroxyphenyl-9,9-fluorene, bis(hydroxyaryl)cycloalkanes such as 1,1-bis(4-hydroxyphenyl)cyclopentane, 1,1-bis(4-hydroxyphenyl)cyclohexane, 1-methyl-1-(4-hydroxyphenyl)-4-(dimethyl-4-hydroxyphenyl)methyl-cyclohexane, 4-[1-[3-(4-hydroxyphenyl)-4-methylcyclohexyl]-1-methylethyl]-phenol, 4,4'-[1-methyl-4-(1-methylethyl)-1,3-cyclohexanediyl]bisphenol and 2,2,2',2'-tetrahydro-3,3,3',3'-tetramethyl-1,1'-spyrobis-[1H-indene]-6,6'-diol, dihydroxyaryl ethers such as bis(4-hydroxyphenyl)ether, bis(4-hydroxy-3,5-dichlorophenyl)ether and 4,4'-dihydroxy-3,3'-dimethylphenyl ether, dihydroxydiaryl sulfides such as 4,4'-dihydroxydiphenyl sulfide and 4,4'-dihydroxy-3,3'-dimethyldiphenyl sulfide, dihydroxydiaryl sulfoxides such as 4,4'-dihydroxydiphenyl sulfoxide and 4,4'-dihydroxy-3,3'-dimethyldiphenyl sulfoxide, dihydroxydiaryl sulfones such as 4,4'-dihydroxydiphenyl sulfone, and 4,4'-dihydroxy-3,3'-dimethyldiphenyl sulfone, dihydroxydiaryl isatins such as 4,4'-dihydroxydiphenyl-3,3'-isatin, dihydroxydiarylxanthenes such as 3,6-dihydroxy-9,9-dimethylxanthene, dihydroxybenzenes such as resorcinol, 3-methylresorcinol, 3-ethylresorcinol, 3-butylresorcinol, 3-t-butylresorcinol, 3-phenylresorcinol, 3-cumylresorcinol, hydroquinone, 2-methylhydroquinone, 2-ethylhydroquinone, 2-butylhydroquinone, 2-t-butylhydroquinone, 2-phenylhydroquinone and 2-cumylhydroquinone, and dihydroxydiphenyls such as 4,4'-dihydroxydiphenyl and 3,3'-dichloro-4,4'-dihydroxydiphenyl.

Out of these, 2,2-bis(4-hydroxyphenyl)propane is preferred because it is stable as a monomer, has a low content of impurities and is easily acquired.

Illustrative examples of the carbonate bond forming compound include phosgenes such as phosgene, trichloromethyl chloroformate and bis(trichloromethyl)carbonate, diaryl carbonates such as diphenyl carbonate and ditolyl carbonate, dialkyl carbonates such as dimethyl carbonate and diethyl carbonate, and alkylaryl carbonates such as methylphenyl carbonate and ethylphenyl carbonate.

When a phosgene is used, a polycarbonate is produced by a solution method and when a carbonic acid ester having a carbonate bond is used, a polycarbonate is produced by a melting method. The cleaning method disclosed by the present invention is particularly effective when a polycarbonate is produced by a melting method.

Out of carbonic acid esters, diphenyl carbonate is preferred. These compounds may be used alone or in combination. The carbonic acid ester compound is used excessively, preferably in an amount of 1.01 to 1.20 mols based on 1 mol of the aromatic dihydroxy compound.

To produce a polycarbonate by an ester exchange method, an ester exchange catalyst is used.

The catalyst is an alkali metal compound, alkali earth metal compound or nitrogen-containing basic compound.

The alkali metal compound is a hydroxide, hydrogencarbonate, carbonate, acetate, nitrate, nitrite, sulfite, cyanate, stearate, borohydride, benzoate, hydrogenphosphate, bisphenol salt or phenol salt of an alkali metal or alkali earth metal.

Illustrative examples of the alkali metal compound include metal sodium, metal potassium, sodium hydroxide, potassium hydroxide, lithium hydroxide, cesium hydroxide, rubidium hydroxide, sodium hydrogencarbonate, potassium hydrogencarbonate, lithium hydrogencarbonate, sodium carbonate, potassium carbonate, lithium carbonate, sodium acetate, potassium acetate, lithium acetate, sodium nitrate, potassium nitrate, lithium nitrate, sodium nitrite, potassium nitrite, lithium nitrite, sodium sulfite, potassium sulfite, lithium sulfite, sodium cyanate, potassium cyanate, lithium cyanate, sodium thiocyanate, potassium thiocyanate, sodium stearate, potassium stearate, lithium stearate, sodium borohydride, lithium borohydride, potassium borohydride, sodium tetraphenyl borate, sodium benzoate, potassium benzoate, lithium benzoate, disodium hydrogenphosphate, dipotassium hydrogenphosphate, dilithium hydrogenphosphate, disodium salts, dipotassium salts and dilithium salts of bisphenol A, and sodium salts, potassium salts and lithium salts of phenol.

The alkali earth metal compound used as a catalyst is a hydroxide, hydrogencarbonate, carbonate, acetate, nitrate, nitrite, sulfite, cyanate, thiocyanate, stearate, benzoate, bisphenol salt or phenol salt of an alkali earth metal.

Illustrative examples of the alkali earth metal compound include calcium hydroxide, barium hydroxide, strontium hydroxide, calcium hydrogencarbonate, barium hydrogencarbonate, strontium hydrogencarbonate, calcium carbonate, barium carbonate, strontium carbonate, calcium acetate, barium acetate, strontium acetate, calcium nitrate, barium nitrate, strontium nitrate, calcium nitrite, barium nitrite, strontiumnitrite, calciumsulfite, bariumsulfite, strontium sulfite, calcium cyanate, barium cyanate, strontium cyanate, calcium thiocyanate, barium thiocyanate, strontium thiocyanate, calcium stearate, barium stearate, strontium stearate, calcium borohydride, barium borohydride, strontium borohydride, calcium benzoate, barium benzoate, strontium benzoate, calcium salts, barium salts, strontium salts of bisphenol A, and calcium salts, barium salts and strontium salts of phenol.

In the present invention, (a) an alkali metal salt of an ate-complex of the group XIV element of the periodic table or (b) an alkali metal salt of an oxoacid of the group XIV element of the periodic table may be used as the alkali metal compound of the catalyst as desired. The group XIV element is silicon, germanium or tin.

Illustrative examples of (a) the alkali metal salt of the ate-complex of the group XIV element of the periodic table are those enumerated in JP-A 7-268091, such as germanium (Ge) compounds including $NaGe(OMe)_5$, $NaGe(OEt)_3$, $NaGe(OPr)_5$, $NaGe(OBu)_5$, $NaGe(OPh)_5$, $LiGe(OMe)_5$, $LiGe(OBu)_5$ and $LiGe(OPh)_5$, and tin (Sn) compounds including $NaSn(OMe)_3$, $NaSn(OMe)_2$ (OEt), $NaSn(OPr)_3$, $NaSn(O-n-C_6H_{13})_3$, $NaSn(OMe)_5$, $NaSn(OEt)_5$, $NaSn$ $(OBu)_5$, $NaSN(O-n-C_{12}H_{25})_5$, $NaSn(OEt)_3$, $NaSn(OPh)_5$ and $NaSnBu_2(OMe)_3$.

(b) The alkali metal salt of the oxoacid of the group XIV element of the periodic table is preferably an alkali metal salt of silicic acid, alkali metal salt of stannic acid or alkali metal salt of germanic acid (IV).

The alkali metal salt of silicic acid is, for example, an acidic or neutral alkali metal salt of monosilicic acid or condensate thereof, as exemplified by monosodium orthosilicate, disodium orthosilicate, trisodium orthosilicate and tetrasodium orthosilicate.

The alkali metal salt of stannic acid is, for example, an acidic or neutral alkali metal salt of monostannic acid or condensate thereof, as exemplified by disodium monostannate ($Na_2SnO_3 \cdot xH_2O$, x=0 to 5) and tetrasodium monostannate ($Na_4SnO_4$).

The alkali metal salt of germanic acid (IV) is, for example, an acidic or neutral alkali metal salt of monogermanic acid (IV) or condensate thereof, as exemplified by monolithium orthogermanate ($LiH_3GeO_4$), disodium orthogermanate, tetrasodium orthogermanate, disodium digermanate ($Na_2Ge_2O_5$), disodiumtetragermanate ($Na_2Ge_4O_9$) and disodium pentagermanate ($Na_2Ge_5O_{11}$).

The alkali metal compound or alkali earth metal compound as a catalyst is preferably used such that the amount of the alkali metal element or alkali earth metal element contained in the catalyst becomes $1 \times 10^{-8}$ to $5 \times 10^{-5}$ equivalent based on 1 mol of the aromatic diol compound. It is more preferably $5 \times 10^{-7}$ to $1 \times 10^{-5}$ equivalent based on the same standard.

In the present invention, the ratio of the alkali metal compound, alkali earth metal compound or nitrogen-containing basic compound to the charged aromatic dihydroxy compound is expressed as a W (numerical value) equivalent of Z (name of a compound) as a metal or basic nitrogen based on 1 mol of the aromatic dihydroxy compound. This means that, for example, when Z has one sodium atom like sodium phenoxide or 2,2-bis(4-hydroxyphenyl)propane monosodium salt or one basic nitrogen like triethylamine, the amount of Z is equivalent to W mols and when Z has two sodium atoms like 2,2-bis(4-hydroxyphenyl)propane disodium salt, the amount of Z is equivalent to W/2 mols.

Outside the above range, such problems arise that they exert a bad influence upon the physical properties of the obtained polycarbonate and that a high molecular weight polycarbonate cannot be obtained because an ester exchange reaction does not proceed fully.

Illustrative examples of the nitrogen-containing basic compound include ammonium hydroxides having an alkyl, aryl or alkylaryl group such as tetramethylammonium hydroxide, tetraethylammonium hydroxide, tetrabutylammonium hydroxide, benzyltrimethylammonium hydroxide and hexadecyltrimethylammonium hydroxide, tertiary amines such as triethylamine, tributylamine, dimethylbenzylamine and hexadecyldimethylamine, and basic salts such as tetramethylammonium borohydride, tetrabutylammonium borohydride, tetrabutylammonium tetraphenyl borate, tetramethylammonium tetraphenyl borate. Out of these, tetramethylammonium hydroxide is preferred.

The nitrogen-containing basic compound is preferably used such that the amount of ammonium nitrogen atoms contained in the nitrogen-containing basic compound becomes $1 \times 10^{-5}$ to $5 \times 10^{-3}$ equivalent based on 1 mol of the aromatic diol compound. It is more preferably $2 \times 10^{-5}$ to $5 \times 10^{-4}$ equivalent, particularly preferably $5 \times 10^{-5}$ to $5 \times 10^{-4}$ equivalent based on the same standard.

The polycondensation reaction of the present invention may be carried out in the presence of at least one co-catalyst selected from the group consisting of oxoacids of the group XIV elements of the periodic table and oxides of the same elements as required together with the above catalyst.

By using the co-catalyst, undesirable side-reactions such as a branching reaction which readily occurs during a polycondensation reaction, the formation of foreign matter in the apparatus during molding and yellowing can be suppressed effectively without reducing the rate of molecular terminal capping reaction and the rate of polycondensation reaction.

The alkali metal compound, alkali earth compound and nitrogen-containing basic compound may be used alone or in combination and may be added separately or simultaneously.

To produce a polycarbonate by a solution method, a hydroxide of an alkali metal such as sodium hydroxide or an amine such as triethylamine or quaternary ammonium compound is used to remove the chlorine of a phosgene.

In the present invention, the temperature and pressure for carrying out an ester exchange reaction between an aromatic dihydroxy compound and a carbonic acid diester are not particularly limited and may be any temperature and pressure if the reaction starts and a monohydroxy compound formed by the reaction is removed to the outside of the reaction system swiftly. After the reaction is started at a temperature of 150 to 200° C. and a pressure of $4.0 \times 10^3$ Pa (30 mmHg) to $1.333 \times 10^4$ Pa (100 mmHg), the reaction temperature is raised and the reaction pressure is lowered as the molecular weight of a polycarbonate increases along with the proceeding of the reaction and the reaction is carried out at a temperature of 270 to 350° C. and a pressure of $1.333 \times 10^2$ Pa (1 mmHg) or less in the end.

More specifically, the reaction is preferably carried out at a temperature of 150 to 220° C. and a pressure of $4.0 \times 10^3$ Pa (30 mmHg) to $1.333 \times 10^4$ Pa (100 mmHg) when the viscosity average molecular weight (Mv) of the polycarbonate is 1,000 to 2,000, at a temperature of 200 to 250° C. and a pressure of $1.333 \times 10^3$ Pa (10 mmHg) to $1.333 \times 10^4$ Pa (100 mmHg) when Mv is 4,000 to 6,000, and at a temperature of 250 to 300° C. and a pressure of $1.333 \times 10^2$ Pa (1 mmHg) or less when Mv is more than 10,000. The pressure unit is absolute pressure unless otherwise stated.

In the present invention, an apparatus and method used to produce a polycarbonate through an ester exchange reaction between an aromatic dihydroxy compound and a carbonic acid diester are not particularly limited and conventionally known apparatuses and methods can be used. When a batch system is used, two reactors are generally connected in series, an agitation tank equipped with a fractionating column is used in the first reactor and an agitation tank without a fractionating column is used in the second reactor to carry out a reaction under different conditions. In this case, preferably, the both reactors are connected by a pipe having a valve, an apparatus comprising a pump for supplying a reaction solution is used as required to supply the reaction product of the first reactor into the second reactor, and the reaction is carried out in the second reactor until a desired degree of polymerization is achieved.

When a continuous system is used, two or more reactors are connected in series, adjacent reactors are connected to each other by a pipe having a valve, an apparatus comprising a pump for supplying a reaction solution is used as required to continuously supply raw materials and a catalyst into the first reactor while these reactors are kept under different conditions, and a polycarbonate having a desired degree of polymerization is extracted continuously from the last reactor.

The molar ratio of the carbonic acid diester to the aromatic dihydroxy compound, which changes according to the capacity of the fractionating column, the reaction rate of a monomer in the reactor, and the amount of OH terminal groups of a polycarbonate to be obtained, is generally 0.8 to 1.5, preferably 0.95 to 1.1, more preferably 1.0 to 1.05.

The materials of units used in these apparatuses are not particularly limited but a material having a high content of iron should not be used. Nickel, stainless steel and the like are preferred.

In the present invention, when the obtained polycarbonate is supplied into an intermeshing double-screw extruder having a vent section to remove volatile matter contained in the polycarbonate and/or add and mix additives, a resin production apparatus characterized in that the side surface of the intermeshing double-screw extruder has an opening and at least a lower portion of a vacuum suction pipe connected to the opening has a falling gradient with respect to the opening is employed to prevent a residence deteriorated product formed in the vent section from being mixed into the polycarbonate, thereby making it possible to produce a polycarbonate which rarely experiences coloring, crosslinking and gel formation, and has an extremely low content of foreign matter.

In the present invention, a catalyst deactivator is added and kneaded with the above polycarbonate obtained by melt polymerization to deactivate a polymerization catalyst, thereby making it possible to produce a polycarbonate which is excellent heat stability, color stability and hydrolysis resistance.

Known catalyst deactivators disclosed by JP-A 8-59975 are effectively used as the catalyst deactivator. Out of these, sulfonic acid ammonium salts, sulfonic acid phosphonium salts and sulfonic acid esters all of which are sulfonic acid compounds represented by the formula (1) are preferred and tetrabutylphosphonium dodecylbenzene sulfonate and tetrabutylammonium paratoluene sulfonate are particularly preferred.

The amount of the catalyst deactivator added is 0.5 to 50 equivalents, preferably 0.5 to 10 equivalents, more preferably 0.8 to 5 equivalents based on 1 mol of the main polycondensation catalyst selected from alkali metal compounds and alkali earth metal compounds. The number of equivalents of the catalyst deactivator is obtained by dividing the number of mols by the number of reaction sites which can react with one valence of a catalyst metal contained in one molecule of the deactivator. When one reaction site is existent in one molecule of the deactivator, 1 mol is equal to 1 equivalent and when two reaction sites are existent, 1 mol is equal to 2 equivalents. The amount of the catalyst deactivator added is generally 0.01 to 500 ppm based on the polycarbonate.

A double-screw extruder having a unit treating zone(s) which consists of a kneading section and a vent section with a material sealing section therebetween (that is, sandwiching a material seal) is preferably used to add and knead the deactivator. The number of unit treating zones may be one or more.

The deactivator is added to and kneaded with a molten polycarbonate in the kneading section directly or after it is dissolved or dispersed in a master pellet or appropriate solvent. The kneading section is located at an upstream of the vent section.

The vent section is depressurized by a vacuum pump or the like to be kept at normal pressure or reduced pressure.

The polycarbonate is kneaded with the deactivator at a temperature of 200 to 350° C., preferably 240 to 320° C. and at a pressure of 0.3 MPa or more, preferably 1.0 MPa or more for a time of 0.1 second or more in the vent section. When the temperature is lower than 200° C., it is difficult to knead the polycarbonate with the deactivator and when the temperature is higher than 350° C., the thermal decomposition of the polycarbonate occurs disadvantageously.

The deactivator may be added in the form of a solution. In this case, the solvent serves as a devolatilizing agent and increases the effect of removing volatile impurities.

In the vent section, the solvent and volatile impurities are removed to the outside of the system by depressurizing with a vacuum pump or the like. Depressurizing conditions include a vent section pressure of $1.013 \times 10^5$ Pa (760 mmHg) or less, preferably $6.667 \times 10^4$ Pa (500 mmHg) or less and a duration of 0.1 second or more. When the vent section pressure is higher than $1.013 \times 10^5$ Pa (760 mmHg), the added solvent and volatile impurities cannot be removed to the outside of the system.

In the present invention, the solvent used to add or knead the deactivator is water, saturated aliphatic hydrocarbon or aromatic hydrocarbon, out of which water is particularly preferred.

The above description is given of the polycarbonate. The present invention can be applied to other resins which may cause such problems as coloring, crosslinking, foreign matter and gel formation. The present invention is very effective for generally used thermoplastic resins, especially polyolefins, polyesters, polyamides and PPS which readily cause such problems as coloring, crosslinking, foreign matter and gel formation. Out of these, polycarbonates are sensitive to such problems as coloring, crosslinking, foreign matter and gel formation. Therefore, the apparatus and method of the present invention are particularly useful for such polycarbonates.

Other general additives such as a processing stabilizer, heat resistant stabilizer, antioxidant, optical stabilizer, ultraviolet light absorber, metal inactivating agent, metal soap, nucleating agent, antistatic agent, lubricant, flame retardant, release agent, mildewproofing agent, colorant, antifogging agent, natural oil, synthetic oil, wax, organic filler, inorganic filler and the like may further be added to the polycarbonate obtained by the present invention in limits that do not impair the object of the present invention.

When a polymer is produced by a solution method, a polymerization terminator such as 4-t-butylphenol is preferably used. The device used to add the above additives, temperature condition and addition time are not particularly limited.

Illustrative examples of the additives are given below.

Examples of the processing stabilizer include 2-t-butyl-6-(3-t-butyl-2-hydroxy-5-methylbenzyl)-4-methylphenyl acrylate and 2-[1-(2-hydroxy-3,5-di-t-pentylphenyl)ethyl]-4,6-di-t-pentylphenyl acrylate.

Examples of the optical stabilizer include ultraviolet light absorbers such as benzotriazole-based compounds including 2-(3-t-butyl-2-hydroxy-5-methylphenyl)-5-chlorobenzotriazole, 2-(3,5-di-t-butyl-2-hydroxyphenyl) benzotriazole, 2-(2-hydroxy-5-methylphenyl)benzotriazole, 2-(2-hydroxy-5-t-octylphenyl)benzotriazole, 2-(3,5-di-t-pentyl-2-hydroxyphenyl)benzotriazole, 2-[2-hydroxy-3-(3,4,5,6-tetrahydrophthalimidemethyl)phenyl]benzotriazole and 2-[2-hydroxy-3,5-bis($\alpha,\alpha$-dimethylbenzyl)phenyl] benzotriazole; benzophenone-based compounds including 2-hydroxy-4-octyloxybenzophenone and 2-hydroxy-4-methoxybenzophenone; and hydroxybenzophenon-based compounds such as 2,4-di-t-butylphenyl and 3,5-di-t-butyl-4-hydroxybenzoate; cyanoacrylate-based compounds including ethyl-2-cyano-3,3-diphenyl acrylate; and nickel-based quenchers such as nickel dibutyldithiocarbamate and [2,2'-thiobis(4-t-octylphenolate)]-2-ethylhexylamine nickel.

Examples of the metal inactivating agent include N,N'-[3-(3,5-di-t-butyl-4-hydroxyphenyl)propionyl]hydrazine and the like. Examples of the metal soap include calcium stearate, nickel stearate and the like.

Examples of the nucleating agent include sorbitol-based and phosphate-based compounds such as sodium di(4-t-butylphenyl)phosphonate, dibenzylidene sorbitol and methylenebis(2,4-di-t-butylphenol)acid phosphate sodium salt.

Examples of the antistatic agent include quaternary ammonium salt-based compounds such as ($\beta$-lauramidepropyl)trimethylammonium methyl sulfate and alkyl phosphate-based compounds.

Examples of the flame retardant include halogen-containing phosphates such as tris (2-chloroethyl)phosphate, halides such as hexabromocyclododecane and decabromophenyl oxide, metal inorganic compounds such as antimony trioxide, antimony pentoxide and aluminum hydroxide, and mixtures thereof.

Examples of the heat resistant stabilizer include phenol-based stabilizers, organic thioether-based stabilizers, hindered amine-based stabilizers and the like.

A general heat resistant stabilizer can be used for a polycarbonate in the present invention. Preferred examples of the heat resistant stabilizer include phosphoric acid, phosphorous acid, hypophosphorous acid, pyrophosphoric acid, polyphosphoric acid, phosphoric acid ester derivatives, phosphorous acid ester derivatives and phosphinic acid compounds.

Phosphoric acid esters are compounds represented by the following general formula:

$$P(OR)_3 \qquad (3)$$

wherein R's are an aliphatic hydrocarbon group, alicyclic hydrocarbon group or aromatic hydrocarbon group and may be the same or different.

Illustrative examples of the stabilizer include arylalkyl phosphites such as bis(2,3-di-t-butylphenyl)pentaerythrityl diphosphite, bis(2,6-di-t-butyl-4-methylphenyl) pentaerythrityl diphosphite, bis (nonylphenyl) pentaerythrityl diphosphite, diphenyldecyl phosphite, diphenylisooctyl phosphite, phenyldiisooctyl phosphite and 2-ethylhexyldiphenyl phosphite, trialkyl phosphites such as trimethyl phosphite, triethyl phosphite, tributyl phosphite, trioctyl phosphite, trinonyl phosphite, tridecyl phosphite, trioctadecyl phosphite and distearyl pentaerythrityl diphosphite, triaryl phosphites such as triphenyl phosphite, tricresyl phosphite, tris(ethylphenyl)phosphite, tris(2,4-di-t-butylphenyl)phosphite, tris(nonylphenyl) phosphite and tris (hydroxyphenyl)phosphite, arylalkyl phosphates such as bis (2,4-di-t-butylphenyl)pentaerythrityl diphosphate, pentaerythrityl(2,4,-di-t-butylphenyl)phosphate (2,4-di-t-butylphenyl)phosphite, bis(nonylphenyl)pentaerythrityl diphosphate, pentaerythrityl(nonylphenyl)phosphate (nonylphenyl)phosphite, diphenyldecyl phosphate, diphenylisooctyl phosphate, phenyldiisooctyl phosphate and 2-ethylhexyldiphenyl phosphate, trialkyl phosphates such as distearylpentaerythrityl diphosphate, pentaerythritylstearyl phosphate stearyl phosphite, bis(tridecyl)pentaerythrityl diphosphate, pentaerythrityltridecyl phosphate tridecyl phosphite, trimethylphosphate, triethylphosphate, tributylphosphate, trioctyl phosphate, trinonyl phosphate, tridecyl phosphate, trioctadecyl phosphate, tris(2-chloroethyl)phosphate and tris(2,3-dichloropropyl) phosphate, and triaryl phosphates such as triphenyl phosphate, tricresyl phosphate, tris(ethylphenyl)phosphate, tris(2,4-di-t-butylphenyl)phosphate, tris(nonylphenyl) phosphate and tris(hydroxyphenyl) phosphate. The stabilizer is not limited to these.

The phosphinic acid compound is, for example, 4,4'-biphenylene diphosphinic acid tetrakis(2,4-di-t-butylphenyl).

Out of these phosphorus-based compounds, phosphorous acid esters represented by the above general formula are preferred and aromatic phosphorous acid esters are more preferred.

These stabilizers may be used alone or in combination and may be added in any stage from polymerization to pelletization.

Generally known release agents may be used, as exemplified by hydrocarbon-based release agents such as paraffins, fatty acid-based release agents such as stearic acid, fatty acid amide-based release agents such as stearic acid amide, alcohol-based release agents such as stearyl alcohol and pentaerythritol and silicone-based release agents such as silicone oil.

Organic and inorganic pigments and dyes may be used as a colorant.

A double-screw extruder having a unit treatment zone(s) which consists of a kneading section and a vent section with a material seal section therebetween is preferably used to add and knead additives.

The additives are added to and kneaded with the molten polycarbonate directly or after they are dissolved or dispersed in a master pellet or appropriate solvent.

The additives are generally kneaded at a temperature of 200 to 350° C., preferably 240 to 320° C. and a pressure of 0.3 MPa or more, preferably 0.5 MPa or more.

A description is subsequently given of an invention relating to the improvement of a horizontal cylindrical vacuum treating apparatus.

The "horizontal cylindrical vacuum treating apparatus" is a horizontal cylindrical apparatus for exposing a resin to vacuum suction in order to control the polymerization degree of a polymer, add various additives including a terminal capping agent and remove volatile matter, for example, an intermeshing double-screw extruder.

The "opening connected to the vacuum suction pipe" formed in the side surface of the horizontal cylindrical vacuum resin treating apparatus is an opening formed to keep the inside of the treating apparatus under vacuum and exhaust the vapor of generated volatile matter when the resin is exposed to vacuum suction and corresponds to an opening in the vent section of the intermeshing double-screw extruder.

The "falling gradient" is intended to prevent a back flow of an adhered material and has an angle from the horizontal plane of preferably 5° to 45°, more preferably 15° to 45°. This "falling gradient" means "α" in FIG. 6 which will be described hereinafter in the case of the lower portion of the vacuum suction pipe.

As for the opening formed in the side surface of the horizontal cylindrical vacuum resin treating apparatus, it is desired that, within the section perpendicular to the axial direction of the treating apparatus, the angle formed by a line connecting the center of the treating apparatus and the lowest position of the opening and by a horizontal line passing through the center of the treating apparatus should be located above the horizontal plane and between 0° and 85° and the angle formed by a line connecting the center of the treating apparatus and the highest position of the opening and by a horizontal line passing through the center of the treating apparatus should be located above the horizontal plane and between 5° and 90°. The former angle is denoted by "β" in FIG. 6 and the latter angle is denoted by "γ" in FIG. 6.

Further, in the opening formed in the side surface of the horizontal cylindrical vacuum resin treating apparatus, when the rotation of a rotor blade is observed from the outside, it is preferred to select the rotation direction of the rotating shaft such that the rotor blade rotates from the bottom to the top. This can reduce the amount of the resin flowing into the opening and prevent a "vent-up" phenomenon that the opening is blocked up with the resin compared with when the opposite rotation direction is selected.

In the present invention, it is desirable to form an undercut in the opening so as to catch the resin into the opening more by the rotor blade. The undercut is a large clearance between the screw and the wall of the cylinder indicated by numeral 10 in FIG. 6 and serves to enable the resin on the screw having a free surface near the opening to be easily caught into the cylinder. Therefore, the position of the undercut differs by the rotation direction of the screw. When the rotor blade rotates from the bottom to the top, the undercut is preferably formed in the upper portion of the opening. The width in an axial direction of the undercut is preferably made larger than the width of the opening at a downstream side of the flow direction of the resin. This can reduce the amount of the resin flowing into the opening and prevent a "vent-up" phenomenon that the opening is blocked up with the resin.

The reason why it is desirable to heat the vacuum suction pipe at a temperature at which the melt viscosity of the treated resin adhered to the vacuum suction pipe becomes 5,000 Pa·s or less is that it has been found that the fluidity of the adhered product is increased by maintaining that viscosity, thereby making easy the removal of the adhered product to the outside of the system. In the case of a polycarbonate having an [η] of 0.5, that state can be realized by maintaining the temperature at 250° C. When the temperature is raised too high, the fluidity of the adhered product may be lowered by the promotion of a crosslinking reaction and a decomposition reaction. In the case of a polycarbonate, the temperature which differs according to molecular weight is preferably between 200° C. and 350° C.

As for the treatment of a polycarbonate using an intermeshing double-screw extruder, the above objects and advantages of the present invention which relates to the improvement of a horizontal cylindrical vacuum treating apparatus are attained by employing a resin production apparatus characterized in that, when a polycarbonate is to be supplied into an intermeshing double-screw extruder having a vent section to remove volatile matter contained in the polycarbonate and/or add and mix additives, the side surface of the intermeshing double-screw extruder has an opening and at least a lower portion of a vacuum suction pipe connected to the opening has a falling gradient with respect to the opening.

The present invention which relates to the improvement of the horizontal cylindrical vacuum treating apparatus will be described with reference to FIGS. 1 to 6.

FIG. 1 shows the section in a direction perpendicular to the axial direction of an intermeshing double-screw extruder of the vent section of the intermeshing double-screw extruder having a vent section of the prior art.

FIG. 2 shows each portion separately of the section of FIG. 1.

FIG. 3 shows the section in a direction perpendicular to the axial direction of an intermeshing double-screw extruder of the vent section of the intermeshing double-screw extruder having a vent section according to the present invention.

FIG. 4 shows each portion separately of the section of FIG. 3.

FIG. 6 is an enlarged sectional view in a direction perpendicular to the axial direction of an intermeshing double-screw extruder of the vent section of the intermeshing double-screw extruder having a vent section according to the present invention.

FIG. 5 shows the portion of FIG. 6 when an opening in the side surface is seen from a barrel.

As shown in FIG. 2, the vent section of an extruder generally used has such a structure that a connection part 3 is installed on the top of a barrel 1 and a vacuum exhaust line 4 is connected to the connection part 3.

In the vacuum suction treatment of the extruder, volatile components contained in the polymer and part of the polymer are scattered and adhered to the inner wall of the connection part 3 and the vacuum exhaust line 4, these adhered products receive heat history and cause heat deterioration such as coloring and the formation of a gel and an insoluble product, and the heat deteriorated product enters the extruder, thereby causing serious quality deterioration.

Therefore, the vacuum exhaust line 4 has a falling gradient with respect to the connection part 3 to prevent the polymer, oligomer and other volatile components adhered to the vacuum exhaust line 4 from returning into the extruder, and a groove 5 is formed in the inner surface right below the vacuum exhaust line 4 attachment portion of the connection part 3 to guide the polymer and the like adhered to the inner surface of the connection part 3 toward the vacuum exhaust line 4 and prevent them from returning into the extruder.

However, it has been found that the heat deteriorated product may return into the extruder across the groove 5 as the amount of the scattered polymer increases by devolatilization using a devolatilizing agent.

It has also been discovered that when additives are added in the extruder, the scattered product may cause drastic heat deterioration in a vacuum suction treatment after the kneading of the additives according to the types of additives used, whereby the connection part 3 is entirely covered with the heat deteriorated product, thereby making it impossible to prevent the heat deteriorated product from returning into the extruder and causing quality deterioration.

According to the above invention, the opening 7 is formed in the side surface of the barrel 6 of the intermeshing double-screw extruder and lower portions 8' and 9' of the connection part 8 and vacuum exhaust line 9 connected to the opening have a falling gradient with respect to the opening of the extruder, thereby making it possible to completely prevent the scattered product from returning into the extruder and greatly improving quality. The opening 7 in FIG. 3 is formed by combining the barrel 6 having a large opening on the left side and the connection part 8 as shown in FIG. 4. It is needless to say that the present invention includes a case where the opening 7 is formed by other means and also a case where there is no connection part 8 and the vacuum line 9 is directly connected to the barrel 6.

The expression "at least the lower portion of a vacuum suction pipes in the above paragraph 1 means the lower portions 8' and 9' of the connection part 8 and the vacuum exhaust line 9 in this embodiment. The reason why the lower portion is specified is that the upper portion may not always have a falling gradient and may be almost horizontal as shown in FIG. 4. When the upper portion has a rising gradient, the adhered products flow back toward the horizontal cylindrical vacuum resin treating apparatus disadvantageously.

In FIG. 6, the expression "falling gradient" in the present invention means "α". As for the opening formed in the side surface of the horizontal cylindrical vacuum resin treating apparatus, within the section in a direction perpendicular to the axial direction of the horizontal cylindrical vacuum resin treating apparatus, the angle formed by a line connecting the center of the treating apparatus and the lowest position of the opening and a horizontal line passing through the center of the apparatus is denoted by "β" and the angle formed by a line connecting the center of the apparatus and the highest position of the opening and a horizontal line passing through the center of the apparatus is denoted by "γ" in the figure.

The "vacuum suction pipe" in the above paragraph 5. comprises the connection part 8 and the vacuum exhaust line 9 in this embodiment. In the above paragraph 5, the reason why "part or all of the vacuum suction pipe" is specified is that it may suffice when only a portion near the opening 7 is heated to meet the condition. It is generally desirable to keep all the portions before the exhaust site under this condition.

The slant line portions 10 in FIG. 5 and FIG. 6 are an undercut portion in this description. The slant line portion in FIG. 6 means a cut-away portion.

The above invention is particularly effective when it is applied to a vacuum suction treatment after kneading a specific additive whose scattered product adhered to the vent section causes drastic heat deterioration.

The specific additive is a phosphorus-based compound listed as the heat resistant stabilizer used to improve the heat resistance of a polycarbonate.

The additive preferably used to carry out the above invention is a combination of the above phosphorus-based compound and a fatty acid ester used to improve releasability.

Examples of the fatty acid ester include glycerin monostearate, glycerin distearate, glycerin tristearate, and monostearate, distearate, tristearate and tetrastearate of pentaerythritol, Further, the above invention can be preferably carried out in a system in which another additive is used in combination with the above additive or independently of the above additive.

A double-screw extruder having a unit treating zone(s) consisting of a kneading section and a vent section with a material seal section therebetween is preferably used to add and knead additives. The number of the unit treating zones may be one or more.

In the kneading section, the additives in the form of a liquid are added to and kneaded with a molten polycarbonate directly or after they are dissolved or dispersed in a master pellet or appropriate solvent. The kneading section is located at an upstream of the vent section.

The vent section is depressurized by a vacuum pump or the like and maintained at normal pressure or reduced pressure.

The polycarbonate is preferably kneaded with additives at an increased pressure and a temperature of 200 to 350° C., preferably 240 to 320° C. for 0.1 second or more. When the temperature is lower than 200° C., it is difficult to knead the polycarbonate with the additives and when the temperature is higher than 350° C., the thermal decomposition of the polycarbonate resin occurs disadvantageously.

The vent section is depressurized by a vacuum pump or the like to remove volatile impurities to the outside of the system. Depressurization conditions include a vent section pressure of $1.013 \times 10^5$ Pa (760 mmHg) or less, preferably $6.667 \times 10^4$ Pa (500 mmHg) or less and a time of 0.1 second or more. When the vent section pressure is higher than $1.013 \times 10^5$ Pa (760 mmHg), the added solvent and volatile impurities cannot be removed to the outside of the system disadvantageously.

In the present invention, the solvent may be used to add and knead the additives. Examples of the solvent include water, saturated aliphatic hydrocarbons and aromatic hydrocarbons.

A preferred mode of the present invention is devolatilization using a devolatilizing agent.

A double-screw extruder having a unit treating zone(s) consisting of a kneading section and a vent section with a material seal section therebetween is preferably used to add and knead the devolatilizing agent. The number of unit treating zones may be one or more.

In the kneading section, the devolatilizing agent is added to and kneaded with a molten polycarbonate at an increased pressure. The kneading section is located at an upstream of the vent section.

The vent section is depressurized by a vacuum pump or the like and maintained at normal pressure or reduced pressure.

The polycarbonate is kneaded with the devolatilizing agent at a temperature of 200 to 350° C., preferably 240 to 320° C. and a pressure of 0.3 MPa or more, preferably 1.0 MPa or more. When the temperature is lower than 200° C., it is difficult to knead the polycarbonate with the devolatilizing agent and when the temperature is higher than 350° C., the thermal decomposition of the polycarbonate resin occurs disadvantageously.

The time for kneading the polycarbonate in the presence of the devolatilizing agent can be specified by the average residence time of the polycarbonate in the kneading section. In the case of an extruder having a plurality of unit treating zones, the time is expressed by the total time, preferably 0.1 to 100 seconds. When the time for kneading the polycarbonate in the presence of the devolatilizing agent is shorter than 0.1 second, the effect of removing impurities lowers disadvantageously. When the time is longer than 100 seconds and water is used as the devolatilizing agent, the polycarbonate is hydrolyzed and its molecular weight lowers. When a substance other than water is used as the devolatilizing agent, the throughput lowers disadvantageously though there is no problem with quality.

The devolatilizing agent is added in an amount of 0.1 to 20 parts by weight based on 100 parts by weight of the polycarbonate in most cases. When the amount of the devolatilizing agent is smaller than 0.1 part by weight, volatile impurities cannot be removed completely and when the amount is larger than 20 parts by weight, the effect of removing impurities does not improve in proportion to the amount of the agent, which is economically disadvantageous.

When the extruder has a plurality of unit treating zones, the amount of the devolatilizing agent in each zone is preferably adjusted to the above range.

The vent section is depressurized by a vacuum pump or the like to remove the solvent and volatile impurities to the outside of the system. The depressurization conditions include a vent section pressure of $1.013 \times 10^5$ Pa (760 mmHg) or less, preferably $6.667 \times 10^4$ Pa (500 mmHg) or less and a time of 0.1 second or more. When the vent section pressure is higher than $1.013 \times 10^5$ Pa (760 mmHg), the added devolatilizing agent and volatile impurities cannot be removed to the outside of the system.

Examples of the devolatilizing agent used in the present invention include water, nitrogen, the above saturated aliphatic hydrocarbons and the above aromatic hydrocarbons. Out of these, water is particularly preferred because it is economically advantageous.

In the present invention, the above described double-screw extruder having a specific vacuum treatment structure is used to add additives and carry out devolatilization, thereby making it possible to prevent the mixing of residence deteriorated products such as colored and crosslinked products, foreign matter and gel and to produce a polycarbonate having an extremely small content of a colored product or foreign matter. Polycarbonates obtained by various methods may be used as the polycarbonate to be supplied into the intermeshing double-screw extruder, as exemplified by what are produced from a reaction between a diphenol and a carbonate precursor such as phosgene in the presence of a known acid receptor and a molecular weight modifier in a solvent such as methylene chloride and what are produced by melt polycondensing an aromatic diol compound and a carbonic acid ester in the presence of an ester exchange catalyst comprising a basic nitrogen compound and alkali metal compound and/or alkali earth metal compound. Particularly, the latter method is preferred because a molten polycarbonate can be obtained from a polymerizer, thereby making it possible to supply the polycarbonate into the extruder directly without solidifying it by cooling and a great effect can be obtained.

A description is subsequently given of an invention which relates to the improvement of a double-screw extruder treating technology.

According to the present invention, the above objects and advantages of the present invention which relates to the improvement of a double-screw extruder treating technology are attained by a method of producing a polycarbonate by treating a molten polycarbonate using an intermeshing double-screw extruder, wherein the molten polycarbonate is supplied to a specific position of the double-screw extruder and the agitation unit of the extruder to which the polycarbonate is supplied has a specific structure.

In the specification of the present application, the following terms mean as follows. FIG. 7 and FIG. 8 are used for explanation when necessary. In FIG. 7 and FIG. 8, circles containing a black dot means that the shaft rotates from the rear side to the front side of the paper and circles containing a mark X means that the shaft rotates from the front side to the rear side of the paper.

In FIG. 7,
the left diagram of (a) is a perspective view of a spindle-shaped plate fitted onto the single rotating shaft of the extruder, the central diagram shows the spindle-shaped plate fitted onto the rotating shaft of the extruder when seen from a direction perpendicular to the center of the rotating shaft of the extruder, and the right diagram shows the spindle-shaped plate fitted onto the rotating shaft of the extruder when seen from the direction of the center of the rotating shaft of the extruder;

(b) is a combination of similar diagrams to those above of a back kneading unit, (c) is a combination of similar diagrams to those above of a forward kneading unit, (d) is a combination of similar diagrams to those above of a neutral kneading unit, (e) is a combination of similar diagrams to those above of a sealing unit, (f) is a combination of similar diagrams to those above of a full flight unit, and (g) is a combination of similar diagrams to those above of a back flight unit.

The resin goes from left to right in the left diagrams of FIG. 7. In the specification of the present application, the long diameter and the short diameter mean lengths indicated by "a" and "b" in the right diagram of (a), respectively.

The expression "agitation unit" means a screw constituent unit having a specific shape and used to stir, knead and transfer the resin in the double-screw extruder for each purpose, such as a back kneading unit, forward kneading unit or neutral kneading unit which will be described hereinafter.

The expression "back kneading units" means a pair of agitation units, each constructed by piling up a plurality of plates having spindle-shaped faces in a direction perpendicular to the thickness direction of the double-screw extruder as shown in FIG. 7(b). When the rotation direction of the rotating shaft of the extruder fitted with the agitation units is positive, the spindle-shaped plates are shifted one from another at a phase larger than 0° and smaller than 90° in a negative direction and piled up in a direction opposite to the traveling direction of the resin to be kneaded and the center of the rotating shaft passes in the vicinity of an intersection between the long axis and short axis of each spindle-shaped plate and in a direction perpendicular to each spindle-shaped plate.

The expression "forward kneading unit" means a pair of agitation units, each constructed by piling up a plurality of plates having spindle-shaped faces in a direction perpendicular to the thickness of the double-screw extruder as shown in FIG. 7(c). When the rotation direction of the rotating shaft of the extruder fitted with the agitation units is positive, the spindle-shaped plates are shifted one from another at a phase larger than 0° and smaller than 90° in a positive direction and piled up in a direction opposite to the traveling direction of the resin to be kneaded and the center of the rotating shaft passes in the vicinity of an intersection between the long axis and short axis of each spindle-shaped plate and in a direction perpendicular to each spindle-shaped plate.

The expression "neutral kneading unit" means a pair of agitation units, each constructed by piling up a plurality of plates having spindle-shaped faces in a direction perpendicular to the thickness of the double-screw extruder as shown in FIG. 7(d). The spindle-shaped plates are shifted one from another at a phase of substantially 90° with respect to the rotation direction of the rotating shaft of the extruder fitted with the agitation units and the center of the rotating shaft passes in the vicinity of an intersection between the long axis and short axis of each spindle-shaped plate and in a direction perpendicular to each spindle-shaped plate.

The expression "upstream side" means an upstream side of a flow of the polycarbonate to be treated and "downstream side" means a downstream side of the flow.

The expression "full flight unit" means a rotor blade portion which is spirally formed round the rotating shaft of the extruder without being disconnected halfway as shown in FIG. 7(f). The spiral direction of the rotor blade portion is selected to ensure that the resin is moved in a flowing direction of the resin by the rotation of the rotating shaft of the extruder and the rotor blade portion exists at two corresponding positions on the rotating shaft of the double-screw extruder.

The expression "back flight unit" means a rotor blade portion which is spirally formed round the rotating shaft of the extruder without being disconnected halfway as shown in FIG. 7(g). The spiral direction of the rotor blade portion is selected to ensure that the resin is moved in a direction opposite to the flowing direction of the resin by the rotation of the rotating shaft of the extruder and the rotor blade portion exists at two corresponding positions on the rotating shaft of the double-screw extruder.

The expression "seal ring unit" means a pair of agitation units, each constructed by at least one plate basically having a round shape in a direction perpendicular to the thickness direction and the center of the rotating shaft passes in the vicinity of the center of the disk in a direction perpendicular to the disk as shown in FIG. 7(e). It has such a structure that the sealing unit stops the flow of the resin and the resin passes through a clearance between the cylinder body and the seal ring unit.

The expression "material seal unit" means the agitation unit of a double-screw extruder installed to enable its upstream portion and downstream portion to take different operation pressures and what includes a space portion substantially completely filled with the resin to be kneaded when the section of the extruder is seen. The "seal ring unit" or the "back flight unit" can be the "material seal unit".

The expression "intermeshing double-screw extruder" means an extruder whose right and left shafts mesh with each other to obtain a self cleaning effect and eliminate a resin residence portion and which has excellent transfer, reaction, kneading and volatile removing capabilities.

The expression "resin filling rate" means the ratio of a volume filled with a molten resin in a space in the double-screw extruder to the volume of the space.

The expression "unidirectional rotary intermeshing double-screw extruder" means an extruder having two parallel screws which mesh with each other and rotate in the same direction.

When a powdery or pellet solid polycarbonate is supplied into the extruder to be treated, a supply portion is not heated, the polycarbonate in a solid state is compressed by the rotation of the screw, supplied into the extruder and molten by heating in a melting zone provided in the inside of the extruder. Thereafter, a terminal capping reaction, the addition and kneading of a stabilizer, the removal of volatile impurities, the addition and kneading of additives and melt extrusion are carried out. In this case, since the polycarbonate supply portion has a low temperature, even when a resident portion called "dead space" or a portion where a polymer flow is little is existent, the marked deterioration of the polycarbonate does not occur, thereby causing no residence deterioration such as coloring, crosslinking and gel formation.

However, when the polycarbonate in a molten state is supplied into the extruder to be treated, the temperature of the supply portion is high. Therefore, if a dead space is existent, the marked deterioration of a polymer occurs, thereby causing serious problems such as color deterioration and an increase in the foreign matter content of a product polymer obtained after the treatment is made.

Since screws for supplying the polymer into the extruder forcedly are used in the supply portion of the extruder, there tends to be a shortage of the polymer at an upstream side of the supply portion, thereby forming a dead space. Therefore, when the solid polymer is supplied, a big problem does not arise but when the molten polymer is supplied, a big problem caused by residence deterioration arises.

In contrast to this, according to the present invention, the position of supplying a molten polycarbonate into the double-screw extruder is the upper portion of one of the screws of the double-screw extruder having such a rotation direction that the supplied polycarbonate is first moved toward the side wall of the cylinder and a position adjacent to the end of the shaft, thereby making it possible to greatly reduce the dead space in the supply portion of the extruder. As a result, the quality of a product polycarbonate obtained by treating by the extruder is greatly improved.

The expression "upper portion of one of the screws of the double-screw extruder having such a rotation direction that the supplied polycarbonate is first moved toward the side wall of the cylinder" in the present invention which relates to the improvement of a double-screw extruder treating technology will be described in detail as follows. That is, when the drive portion of the shaft of the extruder is located at an upstream side of a flow of the polycarbonate and the shaft of the extruder rotates counterclockwise with a downstream side of a flow of the polycarbonate seen from the drive side of the shaft of the extruder, the position of adding the molten polymer is located at the upper portion of the left screw when seen from the drive side and at the upper portion of the right screw when the shaft of the extruder rotates clockwise. When the polymer is supplied to that above position, the polymer (polycarbonate) supplied to one of the screws does not first move toward the other screw of the extruder but toward the wall of the cylinder, whereby the dead space becomes the smallest.

When this is explained with an example where the full flight unit is used in the polycarbonate supply portion of FIG. 8, the "upper portion of one of the screws of the double-screw extruder having such a rotation direction that the supplied polycarbonate is first moved toward the side wall of the cylinder" corresponds to a position denoted by numeral 19. The position denoted by 19 does not always need to be the center of the shaft as shown in FIG. 9 and may be shifted from the center in a horizontal direction if it is on the screw.

The "position adjacent to the end of the shaft" in the present invention means the position of the most upstream portion of a flow of the polycarbonate as understood from the supply position denoted by numeral 19 in FIG. 8. Specifically, it means a position corresponding to the start portion of the agitation unit of the screw.

According to the present invention, it is the most preferred to supply the molten polymer to the above specified position adjacent to the end of the shaft. It is considered that the supply of the molten polymer to the position adjacent to the end of the shaft serves to narrow an area capable of forming a dead space, formed at an upstream side of the supply portion.

When the molten polymer is supplied to the position adjacent to the end of the shaft according to the present invention, the temperature of a shaft seal rises. Therefore, the shaft seal used in the present invention is preferably made from a material having a heat resistance of 250° C. or more.

Specific examples of the shaft seal include 1) a labyrinth seal constructed by arranging metal inner rings and outer rings alternately and 2) a gland seal comprising a packing made from a material obtained by impregnating an inorganic fibrous material such as asbestos, glass fiber or carbon fiber with Teflon and baking it.

As for the preferred constitution of the agitation unit of the molten polymer supply portion, an agitation unit constructed by arranging a full flight unit or a forward kneading unit on the shaft end side, an agitation unit constructed by arranging a back kneading unit on the shaft end side, or an agitation unit constructed by arranging a neutral kneading unit on the shaft end side is preferred.

The forward kneading unit used in the present invention is generally constructed by piling up a plurality of spindle-shaped plates, preferably three or more spindle-shaped plates.

The thickness in the screw shaft direction of the spindle-shaped plate is preferably 0.05 to 0.5 time the diameter of the screw. Preferably, the ratio of the largest length to the smallest length of the spindle shape is 1.1 to 2.0 and the greatest value of length of the spindle shape is 0.950 to 0.995 the diameter of the cylinder body.

The agitation unit used in the present invention is not limited to a forward kneading unit and may be a neutral kneading unit and/or a back kneading unit. The forward kneading unit, neutral kneading unit and back kneading unit may be used alone or in combination as required.

The back kneading unit used in the present invention is generally constructed by piling up a plurality of spindle-shaped plates, preferably 3 or more spindle-shaped plates.

The thickness in the screw shaft direction of the spindle-shaped plate is preferably 0.05 to 0.5 time the diameter of the screw. Preferably, the ratio of the largest length to the smallest length of the spindle shape is 1.1 to 2.0 and the greatest value of length of the spindle shape is 0.950 to 0.995 the diameter of the cylinder body.

The neutral kneading unit used in the present invention is generally constructed by piling up a plurality of spindle-shaped plates, preferably 3 or more spindle-shaped plates.

The thickness in the screw shaft direction of the spindle-shaped plate is preferably 0.05 to 0.5 time the diameter of the screw. Preferably, the ratio of the largest length to the smallest length of the spindle shape is 1.1 to 2.0 and the greatest value of length of the spindle shape is preferably 0.950 to 0.995 of the diameter of the cylinder body.

Out of the agitation units of the molten polymer supply portions used in the present invention, a full flight unit is the most preferred.

In the present invention, a polycarbonate which does not cause residence deterioration such as the coloring, crosslinking and gel formation of a polycarbonate and has an extremely small content of foreign matter can be produced by using the above double-screw extruder. Polycarbonates obtained by various methods may be used as the molten polycarbonate to be supplied into the intermeshing double-screw extruder. The polycarbonates include, for example, what are produced from a reaction between a diphenol and a carbonate precursor such as phosgene in the presence of a known acid receptor and molecular weight modifier in a solvent such as methylene chloride and what are produced by melt polycondensing an aromatic diol compound and a carbonic acid ester in the presence of an ester exchange catalyst consisting of a basic nitrogen compound and an alkali metal compound and/or an alkali earth metal compound. The latter method is preferred because a molten polycarbonate can be obtained from a polymerizer, thereby making it possible to directly supply the polycarbonate into the extruder without being solidified by cooling, and a great effect can be obtained.

When the polycarbonate obtained as described above is to be supplied in a molten state into the unidirectional intermeshing double-screw extruder to cap an OH terminal, add and knead a stabilizer, remove volatile impurities by adding a devolatilizing agent, add and knead additives and melt extrude the obtained polymer, the effect of eliminating a dead space is obtained by supplying the molten polycarbonate to the position of the present invention and a polycarbonate which does not cause residence deterioration such as the coloring, crosslinking and gel formation of the polycarbonate and has an extremely small content of foreign matter can be produced.

In the present invention, a polycarbonate resin having excellent heat stability, color stability and hydrolysis resistance can be produced by capping a terminal using the reactivity of the OH terminal of the polycarbonate having polymerization catalytic activity obtained as described above.

The temperature at the time of kneading the polycarbonate and a terminal capping agent is 200 to 350° C., preferably 240 to 320° C.

The pressure of the vent section after the terminal capping agent is added and kneaded is $1.013\times10^5$ Pa (760 mmHg) or less, preferably $6.667\times10^4$ Pa (500 mmHg) or less.

The terminal capping agent is a compound represented by the following formula:

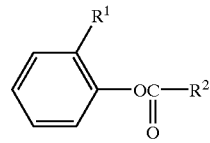

wherein $R^1$ is a chlorine atom, methoxycarbonyl group or ethoxycarbonyl group, $R^2$ is an alkyl group having 1 to 30 carbon atoms, alkoxyl group having 1 to 30 carbon atoms, aryl group having 6 to 30 carbon atoms or aryloxy group having 6 to 30 carbon atoms, the alkyl group having 1 to 30 carbon atoms and alkoxyl group having 1 to 30 carbon atoms may be substituted by methoxycarbonyl, ethoxycarbonyl, (o-methoxycarbonylphenyl)oxycarbonyl or (o-ethoxycarbonylphenyl)oxycarbonyl, and the aryl group having 6 to 30 carbon atoms and aryloxy group having 6 to 30 carbon atoms may be substituted by methoxycarbonyl, ethoxycarbonyl, (o-methoxycarbonylphenyl)oxycarbonyl, (o-ethoxycarbonylphenyl)oxycarbonyl, alkyl having 1 to 30 carbon atoms or alkoxyl having 1 to 30 carbon atoms.

Preferred examples of the compound include methoxycarbonylphenylphenyl carbonate and ethoxycarbonylphenylphenyl carbonate.

The above terminal capping agent is added in an amount of 0.3 to 2 mol/mol based on the hydroxy terminal of the polycarbonate.

In the present invention, after the polycarbonate obtained as described above is subjected to a treatment for deactivating a polymerization catalyst, devolatilization is carried out by adding and kneading the above-described devolatilizing agent and depressurization to produce a polycarbonate resin having an extremely small content of volatile impurities and excellent heat stability, color stability and hydrolysis resistance.

Although the above description is given of the polycarbonate, the present invention can be also applied to a resin which may cause residence deterioration such as coloring, crosslinking and gel formation. The present invention is very effective for generally used thermoplastic resins, particularly polyolefins, polyesters, polyamides and PPS which easily cause residence deterioration such as coloring, crosslinking and gel formation. Especially, polycarbonates are sensitive to residence deterioration such as coloring, crosslinking and gel formation and the utility values of the apparatus and method of the present invention are particularly great.

A description is subsequently given of an invention which relates to a method of adding various agents.

Out of the inventions, the invention of the above paragraph 23. includes not only a case where a sulfonic acid compound and/or a phosphorus-based compound and/or an ester of an aliphatic carboxylic acid and a polyhydric alcohol are always added at the same time but also a case where one or two of these are added. In this case, all the addition conditions of the paragraph 23. are applied to all the agents to be added.

Since the polycarbonate thus produced contains a component other than polycarbonate polymer components in a mixed state, it may also be called "polycarbonate composition".

The expression "pressurized" means a pressure higher than the atmospheric pressure.

The sulfonic acid compound used in the present invention is represented by the following formula (1):

$$A^1—SO_3X^1 \quad (1)$$

wherein $A^1$ is a hydrocarbon group having 1 to 20 carbon atoms which may have a substituent, and $X^1$ is an ammonium cation or phosphonium cation,
and can lower the activity of or deactivate an alkali metal and/or alkali earth metal compound and makes it possible to obtain a polycarbonate having excellent quality such as color, heat resistance and hydrolysis resistance.

The sulfonic acid compound is preferably a sulfonic acid phosphonium salt represented by the following formula (1)-1:

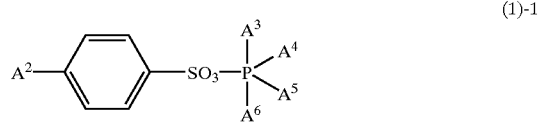

wherein $A^2, A^3, A^4, A^5$ and $A^6$ are each independently a monovalent hydrocarbon group having 1 to 20 carbon atoms.

Illustrative examples of the sulfonic acid phosphonium salt include tetramethylphosphonium hexylsulfonate, tetrabutylphosphonium hexylsulfonate, tetraoctylphosphonium hexylsulfonate, tetramethylphosphonium dodecylsulfonate, tetrabutylphosphonium dodecylsulfonate, tetraoctylphosphonium dodecylsulfonate, tetramethylphosphonium benzenesulfonate, tetrabutylphosphonium benzenesulfonate, tetraoctylphosphonium benzenesulfonate, tetramethylphosphonium toluenesulfonate, tetrabutylphosphonium toluenesulfonate, tetraoctylphosphonium toluenesulfonate, etramethylphosphonium dodecylbenzenesulfonate, etrabutylphosphonium dodecylbenzenesulfonate, etraoctylphosphonium dodecylbenzenesulfonate and the like.

The amount of the sulfonic acid compound may be enough to lower the activity of or deactivate the alkali metal and/or alkali earth metal compound used, specifically 0.00001 to 0.01 part by weight preferably 0.0005 to 0.005 part by weight based on 100 parts by weight of the polycarbonate resin.

An excess of the above sulfonic acid compound remains in the obtained polycarbonate because the sulfonic acid compound is added excessively to the alkali metal and/or alkali earth metal compound in order to lower the activity of or deactivate the alkali metal and/or alkali earth metal compound. Since the sulfonic acid compound is neutral or slightly acidic, it can lower the activity of or deactivate the catalyst without reducing the quality of the obtained polycarbonate.

In the relationship with the catalyst, the amount of the catalyst deactivator is 0.5 to 50 mols, preferably 0.5 to 10 mols, more preferably 0.8 to 5 mols based on 1 mol of the polymerization catalyst selected from the alkali metal compound and/or alkali earth metal compound.

The above listed heat resistant stabilizers can be used as the phosphorus-based compound used in the present invention.

In the preset invention, the phosphorus-based compound can be added in an amount of 0.0001 to 0.1 part by weight, preferably 0.001 to 0.05 part by weight based on 100 parts by weight of the polycarbonate. Outside the range of 0.0001 to 0.1 part by weight, the effect of the agent may not be exhibited to the full or the agent may exert a bad influence upon the quality of the polymer disadvantageously.

A complete ester obtained by esterifying all the OH groups in the molecule with an aliphatic carboxylic acid and a partial ester obtained by esterifying some of the OH groups can be used as the ester of an aliphatic carboxylic acid and a polyhydric alcohol used in the present invention. The partial ester of an aliphatic carboxylic acid and a polyhydric alcohol is the most preferred from the viewpoint of high releasability.

The partial ester of an aliphatic carboxylic acid and a polyhydric alcohol used in the present invention may be used in an amount of 0.0005 to 0.3 part by weight, preferably 0.007 to 0.08 part by weight, more preferably 0.01 to 0.07 part by weight based on 100 parts by weight of the polycarbonate.

Outside the above range of 0.0005 to 0.3 part by weight, the heat resistance of the obtained polycarbonate resin composition lowers, or sufficient releasability and high transferability cannot be obtained.

The partial ester of an aliphatic dicarboxylic acid and a polyhydric alcohol refers to a partial ester having at least one unreacted hydroxyl group of the polyhydric alcohol, preferably monoglyceride and/or diglyceride of a saturated monovalent fatty acid having 12 to 24 carbon atoms.

The aliphatic carboxylic acid is not particularly limited and both saturated and unsaturated aliphatic carboxylic acids may be used. The aliphatic carboxylic acid is preferably a saturated monovalent fatty acid, particularly preferably a saturated monovalent fatty acid having 12 to 24 carbon atoms. When the number of carbon atoms is smaller than 12, the produced polycarbonate resin composition is inferior to a polycarbonate resin composition obtained when the number of carbon atoms is within the above range and gas generation occurs disadvantageously in many cases. When the number of carbon atoms is larger than 24, the releasability of the produced polycarbonate resin composition is lower than a polycarbonate resin composition produced when the number of carbon atoms is within the above range in many cases.

Example of the aliphatic carboxylic acid include dodecylic acid, pentadecylic acid, palmitic acid, heptadecylic acid, stearic acid, nonadecanoic acid, arachic acid, behenic acid, lignoceric acid and the like.

The polyhydric alcohol is not particularly limited and may be a divalent, trivalent, tetravalent, pentavalent or hexavalent alcohol. Out of these, ethylene glycol, propylene glycol, neopentyl glycol, glycerin, trimethylolpropane and pentaerythritol are preferred and glycerin is particularly preferred.

The partial ester of an aliphatic carboxylic acid and a polyhydric alcohol used in the present invention can be obtained by a commonly used esterification reaction.

When the above releasing agent is added, there is a mutual influence between the agent and a substance remaining in the polymer, such as the residual catalyst or catalyst deactivator. In the present invention, a combination of a specific catalyst deactivator and a specific releasing agent is selected to minimize the mutual bad influence, thereby making it possible to provide a polycarbonate having excellent heat stability such as a reduction in molecular weight at the time of molding and color retention and moldability such as releasability and transferability. Further, in the present invention, a polycarbonate having excellent heat stability such as a reduction in molecular weight at the time of molding and color retention and moldability such as releasability and transferability can be provided by a polycarbonate having a specific terminal hydroxyl group concentration and a specific molecular weight which is produced by using raw materials in a specific ratio and a specific amount of a specific catalyst.

The present invention is characterized in that a liquid product of a sulfonic acid compound and/or phosphorus compound and/or an ester of an aliphatic carboxylic acid and a polyhydric alcohol, preferably a partial ester of an aliphatic carboxylic acid and a polyhydric alcohol is added to a certain pressurized portion of a double-screw extruder.

The double-screw extruder usable in the present invention desirably has a kneading section, preferably a unit treating zone consisting of a kneading section, sealing section and depressurizing section. The number of unit treating zones may be one or more as required.

The "kneading section" is an extruder section where more importance is attached to a mixing function than a molten polycarbonate supply function and a puddle type agitating element is installed. When additives such as a sulfonic acid compound, phosphorus-based compound and a partial ester of an aliphatic carboxylic acid and a polyhydric alcohol are added before the kneading section, kneading is advantageously carried out in this section.

The "sealing section" is an extruder section which is provided to enable an upstream portion and a downstream portion of the sealing portion to take different operation pressures for a flow of a molten polycarbonate. When the section of the extruder is seen, the sealing section includes a space portion completely filled with a resin to be kneaded, preferably has a kneading section in an upstream portion and a depressurizing section in a downstream portion. A combination of the kneading section, sealing section and depressurizing section makes it possible to maintain the kneading section at an increased pressure and the depressurizing section at a reduced pressure. The sealing section can be realized by using the above-described seal ring unit or back flight unit.

The "depressurizing section" is an extruder section which is maintained at a reduced pressure by a vacuum pump or the like through a vent port. The full flight unit may be used as a screw of the extruder. The "depressurizing section" may be called "vent section".

In the depressurizing section, depressurization is carried out by a vacuum pump or the like to remove the solvent and volatile impurities to the outside of the system. Depressurization is preferably carried out at $1.013 \times 10^5$ Pa (760 mmHg) or less, preferably $6.667 \times 10^4$ Pa (500 mmHg) or less for 0.1 second or more. When the pressure of the depressurizing section is higher than $1.013 \times 10^5$ Pa (760 mmHg), the added devolatilizing agent and volatile impurities cannot be removed to the outside of the system disadvantageously.

The expression "liquid product" as used herein is a concept which includes a molten product, solution, suspension or emulsion in addition to a liquid product at a use temperature.

For example, when the sulfonic acid compound and/or phosphorus-based compound and/or partial ester of an aliphatic carboxylic acid and a polyhydric alcohol are in a liquid form at normal temperature, they can be used as they are. Even when they are in a liquid form at normal temperature, they may be used by increasing the temperature of the liquid and reducing the viscosity of the liquid to improve liquid supply properties.

When the sulfonic acid compound and/or phosphorus-based compound and/or partial ester of an aliphatic carboxylic acid and a polyhydric alcohol are in a solid form at normal temperature, the scope of the present invention includes a case where they are heated at a temperature higher than the melting point and used in a molten liquid form and further a case where they are dissolved in a solvent to prepare a solution, suspension or emulsion.

The solvent used is not particularly limited if it makes it possible to obtain a liquid product of the sulfonic acid compound and/or phosphorus-based compound and/or partial ester of an aliphatic carboxylic acid and a polyhydric alcohol, to add the liquid product to the polycarbonate in a molten state stably and continuously and to obtain a desired polycarbonate.

Since the solvent used may impair the quality of the obtained polycarbonate if it remains in the polymer, it is preferably removed quickly after kneading. Illustrative examples of the solvent include methylene chloride, tetrahydrofuran, toluene, water and the like.

In the present invention, when the polycarbonate in a molten state and a liquid product of the sulfonic acid compound and/or phosphorus-based compound and/or partial ester between an aliphatic carboxylic acid and a polyhydric alcohol are to be supplied into the double-screw extruder as a mixture or separate liquid products at the same time or separately, the pressure of the pressurized portions of the double-screw extruder to which the liquid products are added is preferably 0.2 MPa (2 kg/cm$^2$) or more, more preferably 0.5 MPa (5 kg/cm$^2$) or more. When the pressure is lower than 0.2 MPa (2 kg/cm$^2$), the liquid products themselves and the solvent or dispersant used may be scattered more at the time of adding the above liquid products. Then, the condition for increasing the pressure to 0.2 MPa (2 kg/cm$^2$) or more or the condition for increasing the pressure to 0.5 MPa (5 kg/cm$^2$) or more includes not only the condition that the additions of all the liquid products satisfy at the same time but also the condition that any one of the pressurized portions of the double-screw extruder has a pressure of 0.2 MPa (2 kg/cm$^2$) or more or 0.5 MPa (5 kg/cm$^2$) or more.

A check valve having a back pressure unit is preferably installed in the connection section between the liquid product addition line and the double-screw extruder to prevent a back flow of the resin in the kneading section.

In the extruder section where the liquid products are added, the liquid products and the molten polymer are contacted to each other and kneaded together quickly after addition so that the liquid products are uniformly dispersed into the polymer. Therefore, the resin filling rate of the extruder section where the liquid products are added is preferably 50% or more, more preferably 80% or more. Therefore, when the double-extruder has a unit treating zone consisting of a kneading section, sealing section and depressurizing section, the liquid products are preferably added to the kneading section. In this case, the expression "resin filling rate is 50% or more" or "80% or more" means not only the condition that the additions of all the liquid products satisfy at the same time but also the condition that any one of the pressurized portions of the double-screw extruder has a "resin filling rate of 50% or more" or "80% or more".

The reason why the condition that the resin filling rate is less than 100% even under pressure is possible is considered to be that a low boiling point compound formed by a polymerization reaction or a low boiling point compound used as a solvent or dispersant for the above liquid products are existent in a gas form.

Since the vent section is a section having a resin filling rate outside the above range in most cases and also under reduced pressure, the additives are scattered around the addition section. When the additives are added continuously for a relatively long time, the quality of the obtained polymer is lowered by the thermal deterioration of the scattered additives, which is not preferred for relatively long time of continuous operation.

A description is subsequently given of an invention which uses a sulfur compound for the cleaning of the polycarbonate.

In the present invention which relates to a cleaning method, an apparatus used for the production of the polycarbonate comprises structures such as a reactor used for the production of a polycarbonate and pipes connected to the reactor. The shapes, sizes and types of the structures are not particularly limited. The structures include, for example, a hopper for charging raw materials, storage tank therefor, dissolution tank for dissolving in a solvent or melting tank for melting by heating, pump and pipe for introducing a catalyst, polymerizer for carrying out a polymerization reaction, more specifically, vertical reactor or horizontal high-viscosity reactor having agitating elements, pipes for transferring raw materials and a reaction product, pumps, kneading reactor for adding additives to a polymerized polymer, extruder such as a double-screw extruder, polymer filter for removing impurities such as dust, casing therefor, valve, agitating shaft agitating elements, the kneading shaft of the extruder, fractionating column, capacitor distillation/reflux pipe, vacuum suction pipe and the like.

In the present invention, some or all of the inner surfaces of these structures which are cleaned with a solution containing a specific compound are used. Out of these, it is preferred to clean the inner surfaces of a polymerizer for carrying out a polymerization reaction, melting tank for melting a monomer, kneading reactor for adding additives to a polymerized polymer and extruder such as a double-screw extruder because an effect can be easily obtained. It is more preferred to clean a polymerizer for carrying out a polymerization reaction, kneading reactor for adding additives to a polymerized polymer and extruder such as a double-screw extruder. It is much preferred to clean the inner surface portions in contact with raw materials, reaction mixture and polymer.

Preferably, the temperatures of these structures can be controlled by a heater or heating medium. These structures may be connected to a line which is capable of controlling its inside pressure. As for cleaning work, a cleaning fluid may be introduced into a polymer production line while all the structures are completely assembled together, or each disassembled or dismantled part may be cleaned according to purpose. It is also preferred that the following cleaning fluid should be added to clean when the polymerization work is shut down.

Metal materials used in these structures are not particularly limited and any metal material may be used if it can be used for the production of a polycarbonate. Stainless steel is preferred. The term "stainless steel" refers to an alloy comprising iron, nickel or chromium as the main ingredient, out of which austenite stainless steel is preferred.

Illustrative examples of the stainless steel include SUS302, SUS304, SUS304L, SUS309, SUS309S, SUS310, SUS310S, SUS316, SUS316L, SUS317, SUS321, SUS347 and the like. Out of these, SUS304 and SUS316 are preferred because they are easily acquired and have excellent workability. Even when hard stainless steel such as Hastelloy is used, there is no limitation within the scope of the invention. The expression "the apparatus includes a reactor having a stainless steel inner surface" means that all the inner surface of the reactor does not always need to be made from stainless steel. However, it is more preferred that the apparatus should include a reactor having a stainless steel inner surface.

In the present invention, the above apparatus some or all of the inner surfaces of which are cleaned with a cleaning fluid containing a sulfur compound is used. The sulfur compound is not particularly limited if it contains sulfur and preferred examples thereof include thiols, thiocyanates, isothiocyanates, thioethers, thioesters, thioureas, thiocarbonates and disulfides. These sulfur-containing compounds may be aromatic or aliphatic but aliphatic compounds are preferred because an effect is easily obtained.

As illustrative examples of the sulfur-containing compound, thiols include aliphatic thiols such as methanethiol, ethanethiol, propanethiol, butanethiol, 1,2-butanedithiol, 1,4-butanedithiol, octanethiol, decanethiol, octanedithiol, dodecanethiol, 1,10-dodecanedithiol, stearyl mercaptan, docosanethiol, cyclopentyl mercaptan, cyclohexanethiol, 1,4-cyclohexanedithiol, 1,3,5-cyclohexanetrithiol and 4-pentene-1-thiol; and aromatic thiols such as benzenethiol, naphthalenethiol, biphenylthiol and 1,4-phenylenedithiol. Thiols containing different functional groups such as an ester group, ether group, carboxyl group and amino group may be preferably used as desired. The thiols include metal salts of 2-mercaptopropionic acid, 3-mercaptopropionic acid ethyl ester, butylthioglycolate, 16-mercaptododecanoic acid, bis(2-mercaptoethyl)ether, L-cysteine, L-cysteineethyl ester and L-cysteinebutyl ester, 2-mercaptoimidazole and the like.

Thiocyanates include aliphatic thiocyanates such as methane thiocyanate, ethane thiocyanate, ethylene dithiocyanate, propane thiocyanate, butane thiocyanate, butane dithiocyanate, 1,4-butane dithiocyanate, octanethiocyanate, docosanethiocyanate, octane dithiocyanate, 1,10-decanedithiocyanate, docosanethiocyanate, hexacosanedithiocyanate, cyclohexanethiocyanate and 1,4-cyclohexane dithiocyanate; and aromatic thiocyanates such as benzene thiocyanate, naphthalene thiocyanate, 1,4-phenylene dithiocyanate and benzyl thiocyanate. Thiocyanates containing different functional groups such as an ester group and ether group may be used as desired. The thiocyanates include 2-ethoxyethane thiocyanate, 4-methoxycarbonylbenzene thiocyanate and the like.

Isothiocyanates include aliphatic isothiocyanates such as methane isothiocyanate, ethane isothiocyanate, ethane diisothiocyanate, propane isothiocyanate, butane isothiocyanate, butane diisothiocyanate, 1,4-butane diisothiocyanate, octaneisothiocyanate, docosaneisothiocyanate, octanediisothiocyanate, docosaneisothiocyanate, cyclohexane isothiocyanate and 1,4-cyclohexane diisothiocyanate; and aromatic isothiocyanates such as benzene isothiocyanate, naphthalene isothiocyanate and 1,4-phenylene diisothiocyanate. Isothiocyanates having different functional groups such as an ester group and ether group may be preferably used as desired. The isothiocyanates include 2-ethoxybutane isothiocyanate, 4-phenoxyphenyl isothiocyanate and the like.

Thioesters include aliphatic thioesters such as propionic acid ethylthioester and γ-thiobutyrolactone; and aromatic thioesters such as benzoic acid methyl thioester. Thioesters containing different functional groups such as an ether group may be preferably used as desired. The thioesters include 2-methoxypropionic acid ethyl thioester and the like.

Thioethers include aliphatic thioethers such as dimethyl sulfide, diethyl sulfide, dibutyl sulfide, di-n-hexyl sulfide, butyloctyl sulfide, trimethylene sulfide, pentamethylene sulfide, 1,3,5-trithiane, 1,3-dithiolan, 1,4,7-trithiacyclodecane and 1,4,7-trithiacyclononane; and aromatic thioethers such as 1,3-bis(phenylthio)propane, diphenyl sulfide, dibenzyl sulfide, dinaphthyl sulfide and bis(2,4-di-n-propylphenyl)sulfide. Thioethers containing different functional groups such as an ester group, ether group, carboxyl group and amino group may be preferably used as desired. The thioethers include 4-ethoxy-n-butyl-hexylthioether, methylmethyl thioacetate, thiomorpholine, 1,4-thioxane, bis(4-methoxycarbonylphenyl)sulfide, 3-butylthiopropionic acid, 2-ethylthiobenzoic acid, 4-butylthiohexylamine, 3-methylthiophenylamine, bis(4-ethoxybenzyl)sulfide and the like.

Thiocarbonates include aliphatic thiocarbonates such as diethyl thiocarbonate, dibutyl thiocarbonate and dimethyl trithiocarbonate; and aromatic thiocarbonates such as diphenyl thiocarbonate. Thiocarbonate containing different functional groups such as an ester group and ether group may be preferably used as desired. The thiocarbonates include bis(2-ethoxyethyl)thiocarbonate, bis(2-acetylethyl)thiocarbonate and the like.

Thioureas include aliphatic thioureas such as thiourea, 1,3-diethyl-2-thiourea, 1,3-dibutyl-2-thiourea, 1,3-diisopropyl-2-thiourea and dicyclohexylthiourea; and aromatic thioureas such as 1,3-diphenyl-2-thiourea. Thioureas containing different functional groups such as an ester group, ether group and amino group may be preferably used as desired. The thioureas include 4-methoxycarbonylphenyl-3-phenyl-2-thiourea, 4-phenoxyphenyl-3-phenylthiourea, 2-thiohyndathoin, 1,1-thiocarbonylimidazole and the like.

Disulfides include aliphatic disulfides such as dimethyl disulfide, diethyl disulfide, dibutyl disulfide, di-n-hexyl disulfide and butyloctyl disulfide; and aromatic disulfides such as diphenyl disulfide, dibenzyl disulfide, dinaphthyl disulfide and bis(2,4-di-n-propylphenyl)disulfide. Disulfides having different functional groups such as an ester group, ether group, carboxyl group and amino group may be preferably used as desired. The disulfides include 4-ethoxybutylhexyl disulfide, bis(4-methoxycarbonylphenylmethyl)disulfide, S-methylthiocysteine, cystine and the like.

Out of these sulfur compounds, octanethiol, trithiane, thiourea, 1,3-diethyl-2-thiourea and dimethyl trithiocarbonate are preferred. These compounds may be used alone or in combination.

Although these compounds fully exhibit their effects when they are used alone, their solutions prepared by mixing, dispersing and dissolving them in a solvent are easy to handle in most cases. Examples of the solvent include water, alcohols such as methanol, ethanol, butanol, hexanol, octanol, lauryl alcohol, isopropanol, t-butanol, 2-ethylhexyl alcohol and ethylene glycol; phenols such as phenol, cresol, nonylphenol and cumylphenol; hydrocarbons such as hexane, heptane, octane, xylene, tolueneandbenzene; ketones such as acetone and butanone; esters such as butyl acetate, methyl salicylate, dimethyl terephthalate and γ-butyrolactone; ethers such as diethyl ether, diphenyl ether, tetrahydrofuran and polyethylene glycol; nitriles such as acetonitrile; sulfones such as dimethyl sulfoxide; carbonates such as dimethyl carbonate, diphenyl carbonate and methylphenyl carbonate; and amides such as dimethyl acetamide and N-methylpyrrolidone. The solvent is not limited to these. Therefore, raw materials such as a bisphenol and carbonate used for the production of a polycarbonate may be molten for use and a solvent such as methylene chloride used for a polymerization process may be used. Out of these, solvents having a boiling point of 150 to 300° C. such as ethylene glycol, triethylene glycol and phenol are preferred.

The amount of the sulfur compound is not particularly limited. The sulfur compound is generally used in an amount of $1 \times 10^{-6}$ to 99 parts by weight based on 1 part by weight of the solvent. The amount is preferably $1 \times 10^{-6}$ to 30 parts by weight, more preferably $1 \times 10^{-6}$ to 10 parts by weight, much more preferably $1 \times 10^{-6}$ to 1 part by weight, the most preferably $1 \times 10^{-6}$ to $1 \times 10^{-1}$ part by weight based on 1 part by weight of the solvent. When the amount is too large, it is economically disadvantageous and it may take time and labor to remove and clean the sulfur compound. When the amount is too small, the cleaning effect becomes insufficient and cleaning may take a long time.

The temperature may be room temperature but preferably 70 to 300° C.

The term "cleaning" in the present invention includes cleaning which is carried out by filing up the reactor with a cleaning fluid, cleaning which is carried out by filling a cleaning fluid to such a level that raw materials, reaction mixture and polymer contact the cleaning fluid at the time of producing a polycarbonate, cleaning which is carried out by maintaining the apparatus to be cleaned at an increased pressure during cleaning to set the temperature of the cleaning fluid to a high level, cleaning which is carried out by evaporating the sulfur compound and/or solvent contained in a cleaning fluid to combine cleaning with the cleaning fluid and cleaning with steam, cleaning which is carried out by maintaining a system at a reduced pressure to evaporate the sulfur compound and/or solvent contained in a cleaning fluid, cleaning which is carried out by circulating a heated cleaning fluid in a cleaning pipe and reactor, cleaning which is carried out by spraying a cleaning fluid in a reactor or the like, and a combination thereof. When cleaning, it is preferably carried out by stirring and/or circulating the cleaning fluid or by evaporating and refluxing the cleaning fluid if possible. The time required for cleaning is not particularly limited but preferably in the range of 0.5 to 5 hours. It is also preferred to substitute inside air with an inert gas such as nitrogen. The cleaning of the present invention may be combined with known cleaning with an acid, alkali, general solvent, water or steam. It is possible through trial and error to find which cleaning method of the present invention should be employed and which cleaning method should be combined with the cleaning method of the present invention and what conditions should be set for these methods according to the selected sulfur compound and reactor.

The foreign matter contained in the polycarbonate in the present invention is mainly small foreign matter having a size of 0.01 to several hundreds of microns such as foreign matter formed during the production of a polymer and not foreign matter such as dust coming from the outside. Although there are various types of foreign matter formed during the process, the above methods are particularly effective in reducing gel foreign matter.

The gel foreign matter is insoluble in dichloromethane and remains on a filter when a polycarbonate solution is filtered with the filter. It is seen semitransparent or transparent when it is observed through a magnification mirror having a magnification of about 10× and essentially composed of a substance which emits light when it is exposed to ultraviolet light having a central spectrum of 340 nm. More specifically, when the gel foreign matter is measured by an infrared microspectrometer, a spectrum similar to that of a polycarbonate is obtained, whereby it seems that a branch structure is formed by some chemical structural change when a polycarbonate is molten, thereby forming a gel.

The gel foreign matter seen in the polymer is various in size, mostly several to 100 $\mu$m. It may be hardly judged whether foreign matter smaller than this is a gel or not.

The branch structure has not been completely elucidated yet and it is considered that some reactions are entangled with one another. Stated more specifically, it is known that a structure similar to the branch structure disclosed by Rufus et al. in the Journal of Applied Polymer Science, vol. 51, pp. 1549–1558, 1994 is formed.

The polymerization of a polycarbonate can be carried out under the same conditions as those of the above conventionally known general methods. The polymer thus obtained generally has a terminal hydroxyl group. This terminal hydroxyl group is preferably capped as desired.

The method of capping the terminal hydroxyl group of a polymer is not particularly limited but preferably a method of capping the terminal hydroxyl group of a polymer using a terminal capping agent described in JP-A 10-36497 disclosed by the present inventors or a method of controlling the molar ratio of charged raw materials. As for the type, amount, addition time and addition method of a capping agent, those disclosed by the above publication may be employed within the scope of the present invention.

A high-quality polycarbonate which is produced by the present invention, is excellent in color and has a small content of foreign matter can be preferably used in optical media such as compact disks, digital video disks, mini disks and optomagnetic disks.

The polycarbonate may be used for application purposes other than optical disks, such as molded products, sheets and films obtained by injection molding, blow molding, extrusion molding, injection blow molding, rotary molding and compression molding. The application of the polycarbonate is not limited to these. For these application purposes, a polycarbonate itself obtained by the present invention or a blend of the polycarbonate and another polymer may be used. According to application purpose, it may be preferably coated with a hard coat or laminated.

The molded products include, for example, optical communication media such as optical fibers, optical parts such as head lamp lenses for cars and lenses for cameras, optical equipment parts such as silent light covers and light lamp covers, window glass substitutes for vehicles such as trains and cars, home window glass substitutes, lighting parts for sunroof s and the roofs of greenhouses, lenses and casings for goggles, sunglasses and spectacles, housings for OA equipment such as copiers, facsimiles and personal computers, housings for home electric appliances such as TVs and microwave ovens, electronic parts such as connectors and IC trays, protective tools such as helmets, protectors and protective surfaces, tableware such as trays, medical supplies such as artificial dialysis casing and artificial teeth, and the like. The molded products are not limited to these.

According to the present invention, there can be provided a production apparatus and method for producing a resin which rarely causes coloring, crosslinking, foreign matter and gel formation and has an extremely small content of foreign matter, which method is suitable for a general resin, particularly a polycarbonate, especially a polycarbonate obtained by a melt polymerization method.

According to the present invention, there can be produced a polycarbonate which achieves the effect of eliminating a dead space, does not cause residence deterioration such as the coloring, crosslinking, crystallized product and gel formation of a polycarbonate and has an extremely small content of foreign matter.

According to the present invention, there can be provided a polycarbonate continuous production method capable of stably producing a polycarbonate which is excellent in color and hydrolysis resistance as well as heat stability such as a reduction in molecular weight at the time of molding and color retention and moldability such as releasability and transferability.

According to the present invention, a polycarbonate which is excellent in color and has an extremely small content of foreign matter, especially gel foreign matter, can be produced by using an apparatus which has been cleaned with a cleaning fluid containing a sulfur compound in accordance with an ester exchange method.

A polycarbonate produced by using the apparatus disclosed by the present invention is useful for the above purposes, especially optical materials, particularly preferably optical disks, and preferably used in recording materials having a small error rate.

BRIEF DESCRIPTION OF THE DRAWINGS

FIG. 5 is a diagram of the portion of FIG. 6 when an opening in a side surface is seen from a barrel;

FIG. 6 is an enlarged sectional view in a direction perpendicular to the axial direction of a double-screw extruder of the vent section of an intermeshing double-screw extruder having a vent section of the present invention;

FIGS. 7a–7g are diagrams showing examples of each agitation unit of the present invention; and FIGS. 8a and 8b are diagrams showing examples of the polycarbonate supply position of the present invention.

Figure 1:
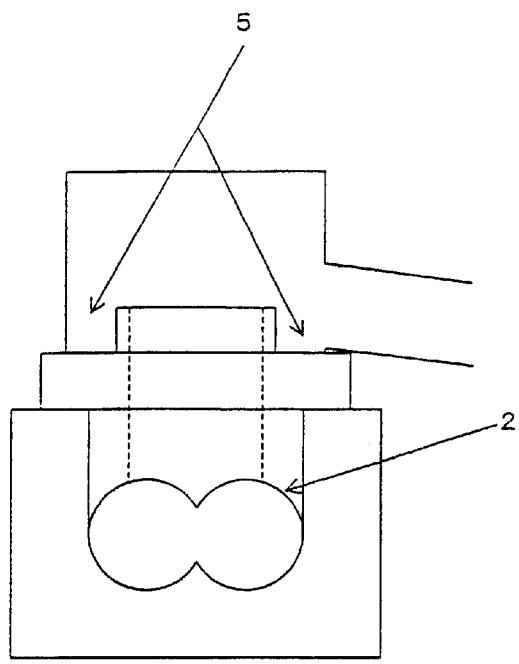
FIG. 1 is sectional view in a direction perpendicular to the axial direction of a double-screw extruder of the vent section of an intermeshing double-screw extruder having a vent section of the prior art.

1 barrel
2 barrel opening
3 connection part
4 vacuum exhaust line
5 groove
6 barrel
7 opening in side surface
8 connection part
9 lower portion of vacuum exhaust line
10 undercut position
11 spindle-shaped plate fitted onto rotating shaft
12 rotating shaft
13 spindle-shaped plate
14 disk plate
15 fill flight unit
16 back flight unit
17 full flight unit
18 rotating shaft
19 polycarbonate supply position

EXAMPLES

The following examples are provided for the purpose of further illustrating the present invention but are in no way to be taken as limiting.

"%" and "parts" in the examples mean "wt. %" and "parts by weight" unless otherwise stated. The physical properties of polycarbonates obtained in the following examples were measured as follows.

[Intrinsic Viscosity and Viscosity Average Molecular Weight]

The intrinsic viscosity of a 0.7 g/dl methylene chloride solution is measured with an Ubbelohde's viscometer to obtain a viscosity average molecular weight.

$$[\eta]=1.23\times10^{-4}M^{0.83}$$

[Melt Viscosity]

The viscosity at a shearing speed of 1 (1/sec) at a measuring temperature (T° C.) is measured with a B type viscometer.

[Amount of Foreign Matter]

1 liter of dichloromethane is added to 100 g of a polymer to obtain a polymer solution. This is filtered with a filter having a pore diameter of 30 μm and then a small amount of dichloromethane is let run through the filter to remove a dichloromethane-soluble component remaining on the filter so as to separate an insoluble component (foreign matter) from a soluble component on the filter. In this method, the amount of foreign matter is evaluated by the total weight and/or number of not only gels but also other foreign matter such as a carbide and crystallized product. When the amount of foreign matter is evaluated by the weight of the insoluble matter (foreign matter), it is obtained by subtracting the dry weight of the filter from the weight of the filter. When the number of gel foreign substances in the insoluble content (foreign matter) is evaluated, the filter is observed through a microscope under exposure to black light (ultraviolet wavelength of 365 nm, SPECTROLINE Co., Ltd.) to count the number of foreign substances.

[Color b Value]

(i) Pellet Color

The obtained pellets are put through a sieve to separate pellets which pass through a 3.35 mm sieve and do not pass through 2.36 mm sieve, the L, a and b values of the pellets are measured with the Color and Color Difference Meter Z-300A of Nippon Denshoku Kogyo Co., Ltd. in accordance with a reflection method, and the b value is used as an index of yellowness.

(ii) Color of Molded Plate

The obtained pellets are molded into a 5 mm thick plate, the L, a and b values of the plate are measured with the Color nd Color Difference Meter ND-1001DP of Nippon Denshoku Kogyo Co., Ltd. in accordance with a transmission method, and the b value is used as an index of yellowness.

[Amount of Residual Phenol]

This is measured by high-speed liquid chromatography (HPLC8020 System of Toso Co., Ltd.).

[Releasability]

A nickel stamper is used to continuously mold 1,000 compact disk substrates having a diameter of 120 by a CD molding machine at a cylinder temperature of 340° C., a mold temperature of 80° C. and a molding cycle of 7 seconds to evaluate the adhesion of the disk substrate or its sprue portion to the mold at the time of opening the mold as a failure (%).

[Transferability]

Pits transferred to the molded disk substrate obtained for the evaluation of releasability are observed through an optical microscope (800×) and evaluated. For Examples and Comparative Examples, 10 disk substrates are evaluated. "All nonuniform in shape" means that the transfer states of the recording surfaces of CD's are all unsatisfactory and "all satisfactory" means that the transfer states are all satisfactory.

[Heat Stability]

Molding is stopped for 20 minutes to stay a resin under the molding conditions for the evaluation of "releasability" and then resumed, and the color and surface state of the obtained disk substrate are evaluated. The surface state of the obtained disk substrate is observed with the eye. The color (YI) is measured by the Color and Color Difference Meter ND-1001DP of Nippon Denshoku Kogyo Co., Ltd.

[Moist Heat Stability (Boiling Water Resistance)]

A reduction in molecular weight after 80 hours of a moist heat treatment at 120° C. of the disk substrate obtained for the evaluation of "releasability" is evaluated. Example 1

2,2-bis(4-hydroxyphenyl)propane and diphenyl carbonate were charged into a melting tank equipped with a stirrer in a molar ratio of 1:1.02, the inside of the tank was substituted with nitrogen, and these substances were dissolved.

Thereafter, the molten mixture was continuously supplied into a vertical agitation tank equipped with a fractionating column, whose inside temperature was maintained at 220° C. and inner pressure at 1.333×10⁴ Pa (100 mmHg), sodium phenoxide and tetramethylammonium hydroxide were continuously added in amounts of 5×10⁻⁷ equivalent and 1×10⁻⁴ equivalent based on 1 mol of 2,2-bis(4-hydroxyphenyl)propane, respectively, and the formed phenol was removed from the fractionating column to carry out a reaction. The obtained reaction product was continuously removed using a gear pump.

Thereafter, the prepolymer was continuously supplied into a vertical agitation tank whose inside temperature was maintained at 250° C. and inside pressure at 1.333×10³ Pa (10 mmHg). The formed phenol was removed from a fractionating column to carry out a reaction. The obtained reaction product was continuously removed using a gear pump.

The prepolymer was continuously supplied into a horizontal single-screw reactor whose inside temperature was maintained at 270° C. and inside pressure at 1.333×10² Pa (1 mmHg). The prepolymer was further polymerized while the formed phenol was removed to the outside of the system to obtain a polycarbonate having a viscosity average molecular weight of 15,300 continuously. The greatest number of foreign substances, mainly gels, contained in 1 kg of this polycarbonate was 38. The greatest color b value of the pellet was 0.1.

Figure 4:
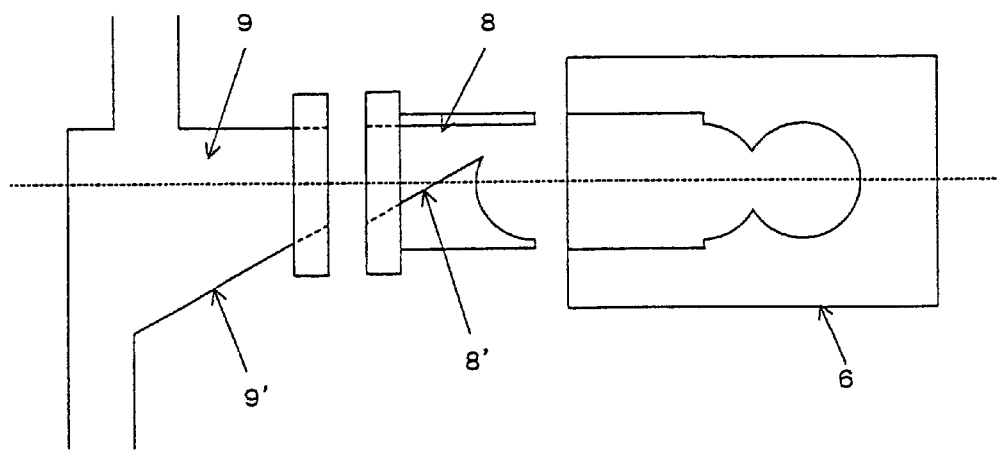
FIG. 4 is a diagram showing each part of the sectional view of FIG. 3.

The polycarbonate was then continuously supplied into an intermeshing double-screw extruder. In the double-screw extruder, tetrabutylphosphonium dodecylbenzene sulfonate was added and kneaded as a deactivator at a pressure of 1.5 MPa and 280" C. for 20 seconds to deactivate the polymerization catalyst, devolatilization was carried out in the vent section at a pressure of 2.0×10³ Pa (15 mmHg) for 20 seconds, water was added and kneaded in an amount of 1 part by weight based on 100 parts by weight of the polycarbonate at a pressure of 1.5 MPa and 280° C. for 20 seconds, devolatilization was carried out in the next vent section at a pressure of 2.0×10³ Pa (15 mmHg) for 20 seconds, glycerin monostearate was added and kneaded as an additive at 0.5 MPa and 280° C. for 15 seconds, and devolatilization was carried out in the next vent section at a pressure of 6.667×10² Pa (5 mmHg) for 20 seconds to obtain a stabilized polycarbonate continuously. Each of the vent sections right after addition and kneading had a structure shown in the sectional views of FIGS. 3 to 6. The relationship among "α", "β" and "γ" is shown in FIG. 6. "α" in FIG. 6 was 35°, "β" was 5° and "γ" was 60°. The rotation direction of the extruder was a direction specified in the above paragraph 4. The vacuum suction pipe (corresponds to the connection part 8 and the vacuum suction line 9 in FIG. 4) was heated at 250° C. When an adhered product in the vacuum pipe was sampled to measure its melt viscosity at this temperature, it was 5 Pa·s.

Thereafter, the polycarbonate in a molten state was extruded from a dice through a gear pump after the double-screw extruder and pelletized by a pelletizer to obtain a final product polycarbonate.

During 90 days of operation, the greatest number of foreign substances contained in 1 kg of the polycarbonate final product was 40 and they were mostly gels. The greatest color b value of the pellet was 0.1.

Example 2

A polycarbonate was obtained in the same manner as in Example 1 except that the additive was trisnonylphenyl phosphate.

During 90 days of operation, the greatest number of foreign substances which were mostly gels contained 1 kg of the polycarbonate final product was 39. The greatest color b value of the pellet was 0.2.

Example 3

A polycarbonate was obtained in the same manner as in Example 1 except that the additive was trimethyl phosphate.

During 90 days of operation, the greatest number of foreign substances which were mostly gels contained in 1 kg of the polycarbonate final product was 40. The greatest color b value of the pellet was 0.1.

Example 4

A polycarbonate was obtained in the same manner as in Example 1 except that the additive was tris(2,4-di-t-butylphenyl)phosphite.

During 90 days of operation, the greatest number of foreign substances which were mostly gels contained in 1 kg of the polycarbonate final product was 40. Further, the greatest color b value of the pellet was 0.2.

Example 5

A polycarbonate was obtained in the same manner as in Example 1 except that the additive was tetrakis(2,4-di-t-butylphenyl) 4,4'-biphenylene diphosphinate.

During 90 days of operation, the greatest number of foreign substances which were mostly gels contained in 1 kg of the polycarbonate final product was 40. Further, the greatest color b value of the pellet was 0.2.

Example 6

2,2-bis(4-hydroxyphenyl)propane and diphenyl carbonate were charged into a melting tank equipped with a stirrer in a molar ratio of 1:1.02, the inside of the tank was substituted with nitrogen, and these substances were dissolved.

Thereafter, the molten mixture was continuously supplied into a vertical agitation tank equipped with a fractionating column, whose inside temperature was maintained at 220° C. and inside pressure at 1.333×10⁴ Pa (100 mmHg), bisphenol A disodium salt and tetramethylammonium hydroxide were continuously added in amounts of 5×10⁻⁷ equivalent and 1×10⁻⁴ equivalent based on 1 mol of 2,2-bis(4-hydroxyphenyl)propane, respectively, and the formed phenol was removed from the fractionating column to carry out a reaction. The obtained reaction product was continuously removed using a gear pump.

Thereafter, the prepolymer was continuously supplied into a vertical agitation tank whose inside temperature was maintained at 250" C. and inside pressure at 1.333×10³ Pa (10 mmHg). The formed phenol was removed from a fractionating column to carry out a reaction. The obtained reaction product was continuously removed using a gear pump.

Thereafter, the prepolymer was continuously supplied into a horizontal single-screw reactor whose inside temperature was maintained at 270° C. and inside pressure at 1.333×10² Pa (1 mmHg). The prepolymer was further polymerized while the formed phenol was removed to the outside of the system to obtain a polycarbonate having a viscosity average molecular weight of 15,300. The greatest number of foreign substances contained in 1 kg of the polycarbonate was 34.

The polycarbonate was continuously supplied into an intermeshing double-screw extruder. The position where the molten polycarbonate was supplied of the double-screw extruder was the upper portion of one of the screws of the double-screw extruder having such a rotation direction that the supplied polycarbonate was first toward the side wall of the cylinder and a position adjacent to the end of the shaft.

The screw agitation unit of the molten polycarbonate supply portion was a full flight unit.

A labyrinth seal consisting of metal inner rings and outer rings arranged alternately was used in the shaft sealing portion of the double-screw extruder and maintained at 270° C.

When the screw shaft was observed with the naked eye after 40 days of operation, a metallic gloss before operation was retained and the adhesion of foreign matter such as a polycarbonate carbide was not seen. Further, the greatest number of foreign substances which were mostly gels contained in 1 kg of the polycarbonate final product during operation was 36.

Example 7

A polycarbonate was obtained in the same manner as in Example 6 except that the agitation-unit of the molten polycarbonate supply portion of the double-screw extruder was changed to a forward kneading unit which was installed on the shaft end side and connected to a full flight unit.

The used forward kneading unit consisted of 5 spindle-shaped plates, and the thickness in the axial direction of the screw of the spindle-shaped plate was 0.1 time the diameter of the screw. The ratio of the maximum length to the minimum length of the spindle shape was 1.614 and the greatest value of length of the spindle shape was 0.979 time the diameter of the cylinder. The spindle-shaped plates were placed one upon another in a traveling direction of the polycarbonate at a phase of 45° in a positive direction when the rotation direction of the shaft was positive.

When the screw shaft was observed with the naked eye after 40 days of operation, a metallic gloss before operation was retained and the adhesion of foreign matter such as a polycarbonate carbide was not seen. The greatest number of foreign substances which were mostly gels contained in 1 kg of the polycarbonate final product during operation was 35.

Example 8

A polycarbonate was obtained in the same manner as in Example 6 except that the agitation unit of the molten polycarbonate supply portion of the double-screw extruder was changed to a neutral kneading unit which was installed on the shaft end side and connected to a full flight unit.

The neutral kneading unit used consisted of 5 spindle-shaped plates, and the thickness in the axial direction of the screw of the spindle-shaped plate was 0.1 time the diameter of the screw. The ratio of the maximum length to the minimum length of the spindle shape was 1.614 and the greatest value of length of the spindle shape was 0.979 time the diameter of the cylinder. The spindle-shaped plates were placed one upon another in a traveling direction of the polycarbonate at a phase of 90° in a positive direction when the rotation direction of the shaft was positive.

When the screw shaft was observed with the naked eye after 40 days of operation, a metallic gloss before operation was retained and the adhesion of foreign matter such as a polycarbonate carbide was not seen. The greatest number of foreign substances which were mostly gels contained in 1 kg of the polycarbonate final product during operation was 36.

Example 9

A polycarbonate was obtained in the same manner as in Example 6 except that the agitation unit of the molten polycarbonate supply portion of the double-screw extruder was changed to a back kneading unit which was installed on the shaft end side and connected to a full flight unit.

The back kneading unit used consisted of 5 spindle-shaped plates, and the thickness in the axial direction of the screw of the spindle-shaped plate was 0.1 time the diameter of the screw. The ratio of the maximum length to the minimum length of the spindle shape was 1.614 and the greatest value of length of the spindle shape was 0.979 time the diameter of the cylinder. The spindle-shaped plates were placed one upon another in a traveling direction of the polycarbonate at a phase of 45° in a negative direction when the rotation direction of the shaft was positive.

When the screw shaft was observed with the naked eye after 40 days of operation, a metallic gloss before operation was retained and the adhesion of foreign matter such as a polycarbonate carbide was not seen. The greatest number of foreign substances which were mostly gels contained in 1 kg of the polycarbonate final product during operation was 35.

Example 10

A polycarbonate was obtained in the same manner as in Example 6 except that the agitation unit of the molten polycarbonate supply portion of the double-screw extruder was changed to a combination of a forward kneading unit, neutral kneading unit and back kneading unit which were installed from the shaft end side and connected to a full flight unit and that the molten polycarbonate was supplied onto the forward kneading unit and the neutral kneading unit.

When the screw shaft was observed with the naked eye after 40 days of operation, a metallic gloss before operation was retained and the adhesion of foreign matter such as a polycarbonate carbide was not seen. The greatest number of foreign substances which were mostly gels contained in 1 kg of the polycarbonate final product during operation was 35.

Example 11

A polycarbonate was obtained in the same manner as in Example 6 except that a gland seal comprising a packing made from a material obtained by impregnating an inorganic fibrous material such as asbestos, glass fiber or carbon fiber with Teflon and baking it was used and that the temperature was set to 270° C.

When the screw shaft was observed with the naked eye after 40 days of operation, a metallic gloss before operation was retained and the adhesion of foreign matter such as a polycarbonate carbide was not seen. The greatest number of foreign substances which were mostly gels contained in 1 kg of the polycarbonate final product during operation was 37.

Example 12

A mixture of bisphenol A (to be abbreviated as BPA hereinafter) and diphenyl carbonate (to be abbreviated as DPC hereinafter) dissolved at 140° C. in amolar ratio of 1:1.04 was transferred to a second agitation tank heated at 180° C. from an agitation tank containing the mixture at a supply rate that the supply speed of the bisphenol A component should become 0.16 kilo-mol/hr. At the same time, BPA and DPC were fed to the agitation tank containing the mixture at rates of 0.160 kilo-mol/hr and 0.166 kilo-mol/hr, respectively, to maintain the liquid surface of this agitation tank at a certain level. Phenol formed along with the proceeding of a reaction was removed by distillation.

Tetramethylammonium hydroxide and bisphenol A disodium salt were added as catalysts to this second agitation tank at rates of 0.024 mol/hr and 0.00008 mol/hr ($1.5 \times 10^{-4}$ equivalent/mol-BPA and $1 \times 10^{-6}$ equivalent/mol-BPA), respectively.

The residence time of the reaction solution in the second agitation tank was 40 minutes.

Thereafter, this reaction solution was supplied into a third agitation tank maintained at a temperature of 210° C. and a pressure of 100 mmHg at a supply rate of a constituent element derived from bisphenol A of 0.16 kilo-mol/hr.

The residence time was 40 minutes. The formed phenol was removed by distillation.

Thereafter, this reaction solution was supplied into a fourth agitation tank maintained at a temperature of 260" C. and a pressure of 15 mmHg at a supply rate of a constituent element derived from bisphenol A of 0.16 kilo/hr.

The residence time was 40 minutes. The formed phenol was removed by distillation.

The reaction product in a stable state had a viscosity average molecular weight of 6,000.

This reaction product was then supplied into a horizontal agitation polymerization tank maintained at a temperature of 275° C. and a pressure of 0.5 mmHg at a supply rate of a constituent element derived from bisphenol A of 0.16 kilo/hr (about 40 kg/hr) to be polymerized for a residence time of 40 minutes. The polymer at this point had a viscosity average molecular weight of 15,500.

This polymer was supplied in a molten state into a double-screw extruder (L/D=44, barrel temperature=260° C.) having three unit treating zones, each consisting of a kneading section, sealing section and depressurizing section (pressure of 15 mmHg), by a gear pump at a supply rate of a constituent element derived from bisphenol A of 0.16 kilo/hr (about 40 kg/hr), 1 part by weight of a 1% suspension of tetrabutylphosphonium dodecylbenzene sulfonate suspended in purified water was added as a sulfonic acid compound to the kneading section of the first treating zone, 0.003 part by weight of trisnonylphenyl phosphite heated at 100° C. was added as a phosphorus compound to the kneading section of the second treating zone, and 0.05 part by weight of monoglyceride stearate molten at 100° C. was added as a partial ester of an aliphatic carboxylic acid and a polyhydric alcohol to the kneading section of the third treating zone continuously based on 100 parts by weight of the polycarbonate and kneaded with the polycarbonate, and the resulting product was formed into a strand through a die and cut by a cutter to obtain pellets.

The conditions and results are shown in Tables 1 and 2.

Example 13

The procedure of Example 12 was repeated except that 1 part by weight of a 1% suspension of tetrabutylphosphonium dodecylbenzene sulfonate suspended in purified water was added as a sulfonic acid compound to the kneading section of the first treating zone, 0.055 part by weight of a mixture (weight ratio of 50:500) of tris(2,4-di-t-butylphenyl) phosphite as a phosphorus compound and monoglyceride stearate as a partial ester of an aliphatic carboxylic acid and a polyhydric alcohol molten at 150" C. was added to the kneading section of the second treating zone, and nothing was added to the third treating zone.

The conditions and results are shown in Tables 1 and 2.

TABLE 1

| | | unit | Ex. 12 | Ex. 13 | Ex. 30 | Ex. 31 |
|---|---|---|---|---|---|---|
| kneading section | applied pressure* | Kg/cm$^2$ | 10 | 10 | — | 10 |
| | resin filling rate | % | 100 | 100 | — | 100 |
| second kneading unit | applied pressure | Kg/cm$^2$ | 5 | 7 | — | 0 |
| | resin filling rate | % | 100 | 100 | — | 15 |
| third kneading unit | applied pressure | Kg/cm$^2$ | 5 | — | — | 5 |
| | resin filling rate | % | 100 | — | — | 100 |

Ex. Example
*This indicates the pressurized state of a portion to which the liquid product is added of a double-screw extruder.

TABLE 2

| | | | Ex. 12 | Ex. 13 | Ex. 30 | Ex. 31 |
|---|---|---|---|---|---|---|
| characteristic properties of pellet | color (Col b) | after 5 hours | 0.3 | 0.4 | 0.4 | 0.3 |
| | | after 200 hours | 0.3 | 0.4 | 0.5 | 0.8 |
| | amount of phenol | (ppm) | 25 | 30 | 25 | 30 |
| CD molding results | releasability | fraction defective (%) | <1 | <1 | Continuous production impossible | <1 |
| | transferability | | All satisfactory | All satisfactory | All nonuniform in shape | All satisfactory |
| | thermal stability | color (YI) | 2.1 | 2.2 | 2.4 | 2.6 |
| | wet heat stability | ΔMv | 100 | 0 | 700 | 300 |

Ex. Example
Notes:
(1) The color b values of pellets "after 5 hours" and "after 200 hours" are values obtained 5 hours and 200 hours after the start of production, respectively.
(2) The amount of phenol is a value of a sample obtained "after 200 hours".
(3) Heat stability out of CD molding results is a value of a sample obtained "after 200 hours".
(4) Releasability out of CD molding results is obtained "after 200 hours".
(5) Transferability and wet heat stability out of CD molding results are values obtained for the first 10 of 1,000 shots.
(6) The expression "all nonuniform in shape" means that the transfer states of the recording surfaces of CD's are all unsatisfactory.

Examples 14 to 16

The entire inner surface of a 1-liter SUS316 separable flask comprising 61.9 wt % of iron, 10.1 wt % of nickel and 17.4 wt % of chromium was buffed (#300) and degreased in heptane. 1 liter of a cleaning fluid having composition shown in Tables 3 and 4 was added to clean the flask at 160° C. for 2 hours.

This was used as a polymerizer and agitating elements made from the same material and treated in the same manner were used to assemble a reactor equipped with a 20 cm long fractionating column and 50 cm long air condenser. 228.31 g (1.0 mol) of bisphenol A and 224.93 g (1.05 mol) of diphenyl carbonate were charged into the reactor, and $1.0 \times 10^{-6}$ mol of a phenol sodium salt and $1.0 \times 10^{-4}$ mol of tetramethylammonium acetate were charged into the reactor as catalysts to start polymerization. After melting at 200° C., a reaction was carried out for 1 hour by distilling off an aromatic hydroxy compound formed by the reaction by reducing the pressure to 100 mmHg. Further, the reaction was continued at 220° C. and 30 mmHg for 30 minutes, at 240° C. and 30 mmHg for 30 minutes and at 260° C. and 10 mmHg for 30 minutes.

Thereafter, the reaction was further carried out at 260° C. and 1.0 mmHg for 2 hours and terminated when the intrinsic viscosity [η] of the polymer became about 0.35. The color of the polymer and the amount of gel foreign matter contained in the polymer were measured. The results are shown in Tables 3 and 4.

Example 17

A polycarbonate continuous polymerization system consisting of a first agitation tank which contained a mixture of bisphenol A and diphenyl carbonate, second agitation tank, third agitation tank equipped with a fractionating column, fourth agitation tank and horizontal agitation polymerization tank which were connected in series, reactor, connection pipes between them, valves and pumps were cleaned.

The first agitation tank was cleaned at 160° C. for 2 hours by filling octanethiol/ethylene glycol having a concentration of 0.05 g/liter up to the liquid contact portion of the first agitation tank, the second agitation tank was cleaned at 160° C. for 2 hours by supplying the cleaning fluid thereto and filing it up to the liquid contact portion thereof, the third agitation tank was cleaned at 160° C. for 2 hours by supplying the cleaning fluid thereto and filling it up to the liquid contact portion thereof, the fourth agitation tank was cleaned at 160° C. for 2 hours by supplying the cleaning fluid thereto and filling it up to the liquid contact portion thereof, and the horizontal agitation polymerization tank was cleaned at 160° C. for 2 hours by supplying the cleaning fluid thereto and filling it up to the liquid contact portion thereof. This operation was repeated twice.

The main inner surfaces of the above tanks, reactor and connection pipes were made from SUS316 which basically comprised 61.9 wt % of iron, 10.1 wt % of nickel and 17.4 wt % of chromium and the insides thereof were buffed (#300) at the time of dismantling.

After substitution with nitrogen, a mixture of bisphenol A and diphenyl carbonate dissolved at 140° C. in a molar ratio of 1:1.04 was supplied from the first agitation tank containing the mixture to the second agitation tank heated at 180° C. at a supply rate of the bisphenol A component of 0.16 kilo-mol/hr. At the same time, bisphenol A and diphenyl carbonate were fed to the first agitation tank containing the mixture to maintain the liquid surface of this agitation tank at a certain level. Phenol formed along with the proceeding of a reaction was removed by distillation.

Tetramethylammonium hydroxide and bisphenol A disodium salt were supplied into the second agitation tank as catalysts in amounts of $1.5 \times 10^{-4}$ equivalent and $5 \times 10^{-7}$ equivalent based on bisphenol A, respectively. The residence time in this tank was about 40 minutes.

Thereafter, this reaction solution was supplied into the third agitation tank maintained at a temperature of 210° C. and a vacuum degree of 100 Torr (13 KPa) at a supply rate of a constituent element derived from bisphenol A of 0.16 kilo-mol/hr. Phenol formed along with the proceeding of a reaction was removed by distillation. The residence time of the reaction solution in this reaction tank was about 40 minutes.

Thereafter, this reaction solution was supplied to the fourth agitation tank maintained at a temperature of 260° C. and a vacuum degree of 15 Torr (2 KPa) at a supply rate of a constituent element derived from bisphenol A of 0.16 kilo-mol/hr. The formed phenol was removed by distillation. The residence time of the reaction solution in this reaction tank was about 40 minutes. The reaction mixture in a stable state had a viscosity average molecular weight of 6,100.

This reaction product was then supplied into the horizontal agitation tank maintained at 275" C. and 1 Torr (133 Pa) at a supply rate of a constituent element derived from bisphenol A of 0.16 kilo-mol/hr by a gear pump and polymerized for a residence time of 40 minutes. Phenol formed by the reaction was removed by distillation. The obtained polymer at this point had an average molecular weight of 15,200.

This polymer was supplied into a double-screw extruder having 3 unit treating zones, each consisting of a kneading section, sealing section and depressurizing section (pressure of 15 mmHg (2 KPa)), a 1% suspension of tetrabutylphosphonium dodecylbenzene sulfonate suspended in purified water was added to the kneading section of the first treating zone in an amount of 1 part by weight based on 100 parts by weight of the polycarbonate, and the resulting mixture was formed into a strand through a die and cut by a cutter to obtain pellets.

After 40 days of operation, the color of the obtained polymer and the amount of gel foreign matter contained in the polymer were measured. As for the measurement of the color of the polymer, a 5 mm thick plate molded out of the molten polymer obtained from the above double-screw extruder through a die was measured. The results are shown in Table 5.

TABLE 3

|  | Ex. 14 | Ex. 15 |
|---|---|---|
| composition of cleaning fluid (sulfur compound/solvent) | octanethiol/ ethylene glycol | 1,3-diethyl-2-thiourea/ phenol |
| concentration of sulfur compound | 0.05 | 0.1 |
| physical properties of polymer |  |  |
| [η] | 0.356 | 0.364 |
| Mv | 14,830 | 15,230 |
| color of molded plate (b value) | 3.2 | 2.9 |
| amount of foreign matter contained in polymer (g/kg of polymer) | 0.1 | 0.2 |
| number of gel foreign substances (per 100 g) | 18 | 21 |

Ex. Example

TABLE 4

|  | Ex. 16 | Ex. 32 |
|---|---|---|
| composition of cleaning fluid (sulfur compound/solvent) | dimethyl trithiocarbonate/ ethylene glycol | none/ethylene glycol |
| concentration of sulfur compound (g/liter) | 0.3 | none |
| physical properties of polymer |  |  |
| [η] | 0.354 | 0.332 |
| Mv | 14,730 | 13,630 |
| color of molded plate (b value) | 3.1 | 5.8 |
| amount of foreign matter contained in polymer (g/kg of polymer) | 0.2 | 1.1 |
| number of gel foreign substances (per 100 g) | 32 | 100 or more |

Ex. Example

TABLE 5

|  | Ex. 17 | Ex. 33 |
|---|---|---|
| physical properties of polymer |  |  |
| color of molded plate (b value) | 2.7 | 5.2 |
| amount of foreign matter contained in polymer (g/kg of polymer) | 0.1 or less | 1.2 |

Ex. Example

Example 18

A continuous polymerization system consisting of a raw material dissolution tank, first vertical agitation tank, second vertical agitation tank, horizontal single-screw polymerizer and extruder was used to produce a polycarbonate and these tanks excluding the extruder, reactor, connection pipes between them, valves and pumps were cleaned before use.

The dissolution tank was cleaned at 160° C. for 2 hours by filling octanethiol/ethylene glycol having a concentration of 0.05 g/liter up to the liquid contact portion thereof, the first vertical agitation tank was cleaned at 160° C. for 2 hours by supplying the cleaning fluid thereto and filling it up to the liquid contact portion thereof, the second vertical agitation tank was cleaned at 160° C. for 2 hours by supplying the cleaning fluid thereto and filling it up to the liquid contact portion thereof, and the horizontal agitation polymerization-tank was cleaned at 160° C. for 2 hours by supplying the cleaning fluid thereto and filling it up to the liquid contact portion. This operation was repeated twice.

The main inner surfaces of the above tanks, reactor and connection pipes were made from SUS316 basically comprising 61.9 wt % of iron, 10.1 wt % of nickel and 17.4 wt % of chromium and the insides thereof were buffed (#300) at the time of dismantling.

After the cleaning operation, 2,2-bis(4-hydroxyphenyl) propane and diphenyl carbonate were charged into a melting tank equipped with a stirrer in a molar ratio of 1:1.02 and dissolved after substitution with nitrogen.

Thereafter, the mixed solution was continuously supplied into the first vertical agitation tank equipped with a fractionating column, whose inside temperature was maintained at 220° C. and inside pressure at $1.333 \times 10^4$ Pa (100 mmHg), and sodium phenoxide and tetramethylammonium hydroxide were continuously added in amounts of $5 \times 10^{-7}$ equivalent and $1 \times 10^{-4}$ equivalent based on 1 mol of 2,2-bis(4-hydroxyphenyl)propane, respectively. A reaction was carried out while the formed phenol was removed from the fractionating column. The obtained reaction product was continuously extracted by a gear pump.

The prepolymer was continuously supplied into the second vertical agitation tank whose inside temperature was maintained at 250° C. and inside pressure at $1.333 \times 10^3$ Pa (10 mmHg). A reaction was carried out by removing the formed phenol from the fractionating column. The obtained reaction product was continuously extracted by a gear pump.

The prepolymer was continuously supplied into the horizontal single-screw reactor whose inside temperature was maintained at 270° C. and inside pressure at $1.333 \times 10^2$ Pa (1 mmHg). The prepolymer was further polymerized while the formed phenol was removed to the outside of the system to continuously obtain a polycarbonate having a viscosity average molecular weight of 15,300.

The greatest number of foreign substances which were mostly gels contained in 1 kg of this polycarbonate was 10. The b value of the pellet was -0.3 to -0.1.

Thereafter, the polycarbonate was continuously supplied into a multi-stage vented intermeshing double-screw extruder (barrel temperature of 260° C.) having 6 unit treating zones, each consisting of a kneading section, sealing section and depressurizing section (also called "vent sections").

The position where the molten polycarbonate was supplied to the double-screw extruder was the upper portion of one of the screws of the double-screw extruder having such a rotation direction that the supplied polycarbonate was first moved toward the side wall of the cylinder and a position adjacent to the end of the shaft. Stated more specifically, the both screws of the double-screw extruder rotate counterclockwise when seen from the motor and the molten polycarbonate was supplied into the extruder from the upper portion of the left screw when seen from the motor and the position adjacent to the end of the shaft.

The screw agitation unit of the extruder where the molten polycarbonate was supplied was a full flight unit and a heat resistant labyrinth seal consisting of metal inner rings and outer rings arranged alternately was used in the shaft sealing portion of the double-screw extruder to maintain the temperature at 270° C.

The polycarbonate supplied into the extruder was subjected to a first-stage post-treatment by continuously supplying a 1% suspension of tetrabutylphosphonium dodecylbenzene sulfonate suspended in purified water as a sulfonic acid compound in an amount of 1 part by weight based on 100 parts by weight of the polycarbonate in the kneading section of the first treating zone.

The injection pressure of the 1% suspension of tetrabutylphosphonium dodecylbenzene sulfonate ("injection pressure" in this specification indicates the pressurized state of the addition portion) was 10 kg/cm²G and the resin filling rate of the kneading section was 100 &.

The polycarbonate was then devolatilized at a pressure of $2.0 \times 10^3$ Pa (15 mmHg) for 20 seconds in the vent section installed adjacent to the downstream side of the kneading section through the sealing section in the first treating zone.

The polycarbonate mixed with the sulfonic acid compound was devolatilized using water as a devolatilizing agent in the second to fourth treating zones.

The conditions for carrying out devolatilization using water as a devolatilizing agent in the treating zones were the same, 1 part by weight of water was added to and kneaded with 100 parts by weight of the polycarbonate in the kneading section of each treating zone at a pressure of 1.5 MPa and at a resin filling rate of 100% for 20 seconds, and then devolatilization was carried out at a pressure of $2.0 \times 10^3$ Pa (15 mmHg) in the vent section adjacent to the downstream side through the sealing section of each treating zone for 20 seconds.

0.003 part by weight of trisnonylphenyl phosphite heated at 100° C. as a phosphorus-based compound was continuously added to and kneaded with the polycarbonate which had been devolatilized using water as a devolatilizing agent in the kneading section of the fifth treating zone and 0.05 part by weight of monoglyceride stearate molten at 100° C. was continuously added to and kneaded with the polycarbonate as a partial ester of an aliphatic carboxylic acid and a polyhydric alcohol in the kneading section of the sixth treating zone.

The resin filling rates in the kneading sections of the fifth and sixth treating zones were 100% and the injection pressures of the additives were 5 kg cm$^2$G. The depressurizing sections of the fifth and sixth treating zones were maintained at $6.667 \times 10^2$ Pa (5 mmHg) and a low-boiling product formed by the kneading of the additives was removed.

The vent section (opening, the same shall apply hereinafter) adjacent to the downstream side of the kneading section of each treating zone through the sealing section was installed on the right side of the extruder when seen from the motor. When the rotation of the shaft was observed from the outside of the vent section, the shaft rotates from the bottom to the top. The relationship among "α", "β" and "γ" of the vent was shown in FIG. 6 and "α" was 35°, "β" was 5° and "γ" was 60°. The vacuum suction pipe (corresponding to the connection part 8 and the vacuum suction line 9 in FIG. 4) was heated at 250° C. When the adhered product in the vacuum pipe was sampled to measure its melt viscosity at this temperature, it was 5 Pa·s.

The polycarbonate which went through a set of treatments in the extruder was formed into a strand through a die and cut by a cutter to obtain pellets.

During 90 days of operation, the greatest number of foreign substances contained in 1 kg of the polycarbonate final product was 10 and an increase in the number of foreign substances which were mostly gels in the treatments with the extruder was not observed. The b value of the pellet was $-0.2 \pm 0.1$. Deterioration in b value was not seen.

When the screw shaft was observed with the naked eye after operation, a metallic gloss before operation was retained and the adhesion of foreign matter such as a polycarbonate carbide was rarely observed.

The pellet obtained above was evaluated as follows. The results are shown in Table 6.

Example 19

A continuous polymerization system consisting of a raw material dissolution tank, first vertical agitation tank, second vertical agitation tank, horizontal single-screw polymerization tank and extruder was used to produce a polycarbonate. The main portions of the continuous polymerization system were made from SUS316 and special cleaning was not carried out.

Polymerization was carried out in the same manner as in Example 18 to obtain a polycarbonate having a viscosity average molecular weight of 15,300 continuously.

The greatest number of foreign substances which were mostly gels contained in 1 kg of this polycarbonate was 20. The b value of the pellet was $0.1 \pm 0.1$.

Thereafter, the polycarbonate was continuously supplied into a multi-stage vented intermeshing double-screw extruder (barrel temperature of 260° C.) having 6 unit treating zones, each consisting of a kneading section, sealing section and depressurizing section (also called "vent section"). The position where the molten polycarbonate was supplied into the double-screw extruder was the upper portion of one of the screws of the double-screw extruder having such a rotation direction that the supplied polycarbonate was first moved toward the side wall of the cylinder and a position adjacent to the end of the shaft. Stated more specifically, the both screws of the double-screw extruder rotate counterclockwise when seen from the motor and the molten polycarbonate was supplied into the extruder from the upper portion of the left screw when seen from the motor and the position adjacent to the end of the shaft.

The screw agitation unit of the extruder where the molten polycarbonate was supplied was a full flight unit and a heat resistant labyrinth seal consisting of metal inner rings and outer rings arranged alternately was used in the shaft sealing portion of the double-screw extruder to maintain the temperature at 270° C.

The polycarbonate supplied into the extruder was subjected to a first-stage post-treatment by continuously supplying a 1% suspension of tetrabutylphosphonium dodecylbenzene sulfonate suspended in purified water as a sulfonic acid compound in an amount of 1 part by weight based on 100 parts by weight of the polycarbonate in the kneading section of the first treating zone.

The injection pressure of the 1% suspension of tetrabutylphosphonium dodecylbenzene sulfonate was 10 kg/cm$^2$G and the resin filling rate of the kneading section was 100%.

The polycarbonate was then devolatilized at a pressure of $2.0 \times 10^3$ Pa (15 mmHg) for 20 seconds in the vent section installed adjacent to the downstream side of the kneading section through the sealing section in the first treating zone.

The polycarbonate mixed with the sulfonic acid compound was devolatilized using water as a devolatilizing agent in the second to fourth treating zones. The conditions for carrying out devolatilization using water as a devolatilizing agent in the treating zones were the same, 1 part by weight of water was added to and kneaded with 100 parts by weight of the polycarbonate in the kneading section of each treating zone at a pressure of 1.5 MPa and at a resin filling rate of 100% for 20 seconds, and then devolatilization was carried out at a pressure of $2.0 \times 10^3$ Pa (15 mmHg) in the vent section adjacent to the downstream side through the sealing section of each treating zone for 20 seconds.

0.003 part by weight of trisnonylphenyl phosphite heated at 100° C. as a phosphorus-based compound was continuously added to and kneaded with the polycarbonate which had been devolatilized using water as a devolatilizing agent in the kneading section of the fifth treating zone and 0.05 part by weight of monoglyceride stearate molten at 100° C. was continuously added to and kneaded with the polycarbonate as a partial ester of an aliphatic carboxylic acid and a polyhydric alcohol in the kneading section of the sixth treating zone.

The resin filling rates in the kneading sections of the fifth and sixth treating zones were 100 t and the injection pressures of the additives were 5 kg/cm$^2$G. The depressurizing sections of the fifth and sixth treating zones were maintained at 6.667×10$^2$ Pa (5 mmHg) and a low-boiling product formed by the kneading of the additives was removed.

The vent section adjacent to the downstream side of the kneading section of each treating zone through the sealing section was installed on the right side of the extruder when seen from the motor. When the rotation of the shaft was observed from the outside of the vent section, the shaft rotates from the bottom to the top. The relationship among "α", "β" and "γ" of the vent was shown in FIG. 6 and "α" was 35°, "β" was 5° and "γ" was 60°. The vacuum suction pipe (corresponding to the connection part 8 and the vacuum suction line 9 in FIG. 4) was heated at 250° C. When the adhered product in the vacuum pipe was sampled to measure its melt viscosity at this temperature, it was 5 Pa·s.

The polycarbonate which went through a set of treatments in the extruder was formed into a strand through a die and cut by a cutter to obtain pellets.

During 90 days of operation, the greatest number of foreign substances contained in 1 kg of the polycarbonate final product was 20 and an increase in the number of foreign substances which were mostly gels in the treatments with the extruder was not observed. The b value of the pellet was 0.1±0.1. Deterioration in b value was not seen.

When the screw shaft was observed with the naked eye after operation, a metallic gloss before operation was retained and the adhesion of foreign matter such as a polycarbonate carbide was rarely observed.

Example 20

A continuous polymerization system consisting of a raw material dissolution tank, first vertical agitation tank, second vertical agitation tank, horizontal single-screw polymerization tank and extruder was used to produce a polycarbonate. The main portions of the continuous polymerization system were made from SUS316 and special cleaning was not carried out.

Polymerization was carried out in the same manner as in Example 18 to obtain a polycarbonate having a viscosity average molecular weight of 15,300 continuously.

The greatest number of foreign substances which were mostly gels contained in 1 kg of this polycarbonate was 18. The b value of the pellet was 0.1±0.1.

Thereafter, the polycarbonate was continuously supplied into amulti-stage vented intermeshing double-screw extruder (barrel temperature of 260° C.) having 6 unit treating zones, each consisting of a kneading section, sealing section and depressurizing section (also called "vent section"). The position where the molten polycarbonate was supplied into the double-screw extruder was the upper portion of one of the screws of the double-screw extruder having such a rotation direction that the supplied polycarbonate was first moved toward the side wall of the cylinder and a position adjacent to the end of the shaft. Stated more specifically, the both screws of the double-screw extruder rotate counterclockwise when seen from the motor and the molten polycarbonate was supplied into the extruder from the upper portion of the left screw when seen from the motor and the position adjacent to the end of the shaft.

The screw agitation unit of the extruder where the molten polycarbonate was supplied was a full flight unit and a heat resistant labyrinth seal consisting of metal inner rings and outer rings arranged alternately was used in the shaft sealing portion of the double-screw extruder to maintain the temperature at 270° C.

The polycarbonate supplied into the extruder was subjected to a first-stage post-treatment by continuously supplying a 1% suspension of tetrabutylphosphonium dodecylbenzene sulfonate suspended in purified water as a sulfonic acid compound in an amount of 1 part by weight based on 100 parts by weight of the polycarbonate in the kneading section of the first treating zone.

The injection pressure of the 1% suspension of tetrabutylphosphonium dodecylbenzene sulfonate was 10 kg/cm$^2$G and the resin filling rate of the kneading section was 100%.

The polycarbonate was then devolatilized at a pressure of 2.0×10$^3$ Pa (15 mmHg) for 20 seconds in the vent section installed adjacent to the downstream side of the kneading section through the sealing section in the first treating zone.

The polycarbonate mixed with the sulfonic acid compound was devolatilized using water as a devolatilizing agent in the second to fourth treating zones. The conditions for carrying out devolatilization using water as a devolatilizing agent in the treating zones were the same, 1 part by weight of water was added to and kneaded with 100 parts by weight of the polycarbonate in the kneading section of each treating zone at a pressure of 1.5 MPa and at a resin filling rate of 100% for 20 seconds, and then devolatilization was carried out at a pressure of 2.0×10$^3$ Pa (15 mmHg) in the vent section adjacent to the downstream side through the sealing section of each treating zone for 20 seconds.

0.003 part by weight of trisnonylphenyl phosphite heated at 100° C. as a phosphorus-based compound was continuously added to and kneaded with the polycarbonate which had been devolatilized using water as a devolatilizing agent in the kneading section of the fifth treating zone and 0.05 part by weight of monoglyceride stearate molten at 100° C. was continuously added to and kneaded with the polycarbonate as a partial ester of an aliphatic carboxylic acid and a polyhydric alcohol in the kneading section of the sixth treating zone.

The resin filling rates in the kneading sections of the fifth and sixth treating zones were 100% and the injection pressures of the additives were 5 kg/cm$^2$G. The depressurizing sections of the fifth and sixth treating zones were maintained at 6.667×10$^2$ Pa (5 mmHg) and a low-boiling product formed by the kneading of the additives was removed.

An ordinary vent having an opening in the upper portion of the extruder was used in the vent section installed adjacent to the downstream side of the kneading section of each treating zone through the sealing section. The vacuum suction pipe connected to the vent was heated at 250° C.

The polycarbonate which-went through a set of treatments in the extruder was formed into a strand through a die and cut by a cutter to obtain pellets. The obtained pellets were evaluated in the same manner as in Example 18. The results are shown in Table 6.

During 90 days of operation, the greatest number of foreign substances contained in 1 kg of the polycarbonate final product was 30 and an increase in the number of foreign substances which were mostly gels in the treatments with the extruder was small. The b value of the pellet was 0.0 to 0.3 and rarely deteriorated.

When the screw shaft was observed with the naked eye after operation, it was fine with a metallic gloss but a stain which seemed to be derived from a polycarbonate modified product was slightly observed at a position corresponding to the opening of the vent.

Example 21

A continuous polymerization system consisting of a raw material dissolution tank, first vertical agitation tank, second vertical agitation tank, horizontal single-screw polymerization tank and extruder was used to produce a polycarbonate. The main portions of the continuous polymerization system were made from SUS316 and special cleaning was not carried out.

Polymerization was carried out in the same manner as in Example 18 to obtain a polycarbonate having a viscosity average molecular weight of 15,300 continuously.

The greatest number of foreign substances which were mostly gels contained in 1 kg of this polycarbonate was 22. The b value of the pellet was 0.1±0.1.

Thereafter, the polycarbonate was continuously supplied into a multi-stage vented intermeshing double-screw extruder (barrel temperature of 260° C.) having 4 unit treating zones, each consisting of a kneading section, sealing section and depressurizing section (also called "vent section").

The position where the molten polycarbonate was supplied into the double-screw extruder was the upper portion of one of the screws of the double-screw extruder having such a rotation direction that the supplied polycarbonate was first moved toward the side wall of the cylinder and a position adjacent to the end of the shaft.

Stated more specifically, the both screws of the double-screw extruder rotate counterclockwise when seen from the motor and the molten polycarbonate was supplied into the extruder from the upper portion of the left screw when seen from the motor and the position adjacent to the end of the shaft.

The screw agitation unit of the extruder where the molten polycarbonate was supplied was a full flight unit and a heat resistant labyrinth seal consisting of metal inner rings and outer rings arranged alternately was used in the shaft sealing portion of the double-screw extruder to maintain the temperature at 270° C.

The polycarbonate supplied into the extruder was subjected to a first-stage post-treatment by continuously supplying a 1% suspension of tetrabutylphosphonium dodecylbenzene sulfonate suspended in purified water as a sulfonic acid compound in an amount of 1 part by weight based on 100 parts by weight of the polycarbonate in the kneading section of the first treating zone.

The injection pressure of the 1% suspension of tetrabutylphosphonium dodecylbenzene sulfonate was 10 kg/cm$^2$G and the resin filling rate of the kneading section was 100%.

The polycarbonate was then devolatilized at a pressure of 2.0×10$^3$ Pa (15 mmHg) for 20 seconds in the vent section installed adjacent to the downstream side of the kneading section through the sealing section in the first treating zone. The polycarbonate mixed with the sulfonic acid compound was devolatilized using water as a devolatilizing agent in the second to fourth treating zones.

The conditions for carrying out devolatilization using water as a devolatilizing agent in the treating zones were the same, 1 part by weight of water was added to and kneaded with 100 parts by weight of the polycarbonate in the kneading section of each treating zone at a pressure of 1.5 MPa and at a resin filling rate of 100% for 20 seconds, and then devolatilization was carried out at a pressure of 2.0×10$^3$ Pa (15 mmHg) in the vent section adjacent to the downstream side through the sealing section of each treating zone for 20 seconds.

The vent section adjacent to the downstream side of the kneading section of each treating zone through the sealing section was installed on the right side of the extruder when seen from the motor. When the rotation of the shaft was observed from the outside of the vent section, the shaft rotates from the bottom to the top. The relationship among "α", "β" and "γ" of the vent was shown in FIG. 6 and "α" was 35°, "β" was 5° and "γ" was 60°. The vacuum suction pipe (corresponding to the connection part 8 and the vacuum suction line 9 in FIG. 4) was heated at 250° C. When the adhered product in the vacuum pipe was sampled to measure its melt viscosity at this temperature, it was 5 Pa·s.

The polycarbonate which went through a set of treatments in the extruder was formed into a strand through a die and cut by a cutter to obtain pellets. Since the obtained pellet did not contain additives, the molding valuations shown in Example 18 were not carried out.

During 90 days of operation, the greatest number of foreign substances contained in 1 kg of the polycarbonate final product was 24 and an increase in the number of foreign substances which were mostly gels in the treatments with the extruder was not observed. The b value of the pellet was 0.1±0.1 and deterioration in b value was not observed. The content of phenol in the pellet was stable at 20 to 25 ppm.

When the screw shaft was observed with the naked eye after operation, it retained a metallic gloss before operation and the adhesion of foreign matter such as a polycarbonate carbide was rarely observed.

Example 22

A continuous polymerization system consisting of a raw material dissolution tank, first vertical agitation tank, second vertical agitation tank, horizontal single-screw polymerization tank and extruder was used to produce a polycarbonate. The main portions of the continuous polymerization system were made from SUS316 and special cleaning was not carried out.

Polymerization was carried out in the same manner as in Example 18 to obtain a polycarbonate having a viscosity average molecular weight of 15,300 continuously.

The greatest number of foreign substances which were mostly gels contained in 1 kg of this polycarbonate was 20. The b value of the pellet was 0.1±0.1.

Thereafter, the polycarbonate was continuously supplied into a multi-stage vented intermeshing double-screw extruder (barrel temperature of 260° C.) having 6 unit treating zones, each consisting of a kneading section, sealing section and depressurizing section (also called "vent section"). The position where the molten polycarbonate was supplied into the double-screw extruder was between the two screws of the double-screw extruder and an upper portion near the end of the shaft.

The screw agitation unit of the extruder where the molten polycarbonate was supplied was a full flight unit and a heat resistant labyrinth seal consisting of metal inner rings and outer rings arranged alternately was used in the shaft sealing portion of the double-screw extruder to maintain the temperature at 270° C.

The polycarbonate supplied into the extruder was subjected to a first-stage post-treatment by continuously supplying a 1% suspension of tetrabutylphosphonium dodecylbenzene sulfonate suspended in purified water as a sulfonic acid compound in an amount of 1 part by weight based on 100 parts by weight of the polycarbonate in the kneading section of the first treating zone.

The injection pressure of the 1% suspension of tetrabutylphosphonium dodecylbenzene sulfonate was 10 kg/cm²G and the resin filling rate of the kneading section was 100%.

The polycarbonate was then devolatilized at a pressure of $2.0 \times 10^3$ Pa (15 mmHg) for 20 seconds in the vent section installed adjacent to the downstream side of the kneading section through the sealing section in the first treating zone. The polycarbonate mixed with the sulfonic acid compound was devolatilized using water as a devolatilizing agent in the second to fourth treating zones.

The conditions for carrying out devolatilization using water as a devolatilizing agent in the treating zones were the same, 1 part by weight of water was added to and kneaded with 100 parts by weight of the polycarbonate in the kneading section of each treating zone at a pressure of 1.5 MPa and at a resin filling rate of 100% for 20 seconds, and then devolatilization was carried out at a pressure of $2.0 \times 10^3$ Pa (15 mmHg) in the vent section adjacent to the downstream side through the sealing section of each treating zone for 20 seconds.

0.003 part by weight of trisnonylphenyl phosphite heated at 100° C. as a phosphorus-based compound was continuously added to and kneaded with the polycarbonate which had been devolatilized using water as a devolatilizing agent in the kneading section of the fifth treating zone and 0.05 part by weight of monoglyceride stearate molten at 100° C. was continuously added to and kneaded with the polycarbonate as a partial ester of an aliphatic carboxylic acid and a polyhydric alcohol in the kneading section of the sixth treating zone.

The resin filling rates in the kneading sections of the fifth and sixth treating zones were 100% and the injection pressures of the additives were 5 kg/cm²G. The depressurizing sections of the fifth and sixth treating zones were maintained at $6.667 \times 10^2$ Pa (5 mmHg) and a low-boiling product formed by the kneading of the additives was removed.

The vent section adjacent to the downstream side of the kneading section of each treating zone through the sealing section was installed on the right side of the extruder when seen from the motor. When the rotation of the shaft was observed from the outside of the vent section, the shaft rotates from the bottom to the top. The relationship among "α", "β" and "γ" of the vent was shown in FIG. 6 and "α" was 35°, "β" was 5° and "γ" was 60°. The vacuum suction pipe (corresponding to the connection part 8 and the vacuum suction line 9 in FIG. 4) was heated at 250° C. When the adhered product in the vacuum pipe was sampled to measure its melt viscosity at this temperature, it was 5 Pa·s.

The polycarbonate which went through a set of treatments in the extruder was formed into a strand through a die and cut by a cutter to obtain pellets. The obtained pellet was evaluated in the same manner as in Example 18. The results are shown in Table 6.

During 90 days of operation, the greatest number of foreign substances contained in 1 kg of the polycarbonate final product was 35 and an increase in the number of foreign substances which were mostly gels in the treatments with the extruder was small. The b value of the pellet was 0.0 to 0.3 and rarely deteriorated.

When the screw shaft was observed with the naked eye after operation, it was fine with a metallic gloss but a stain which seemed to be derived from a polycarbonate modified product was slightly observed at a position corresponding to the polycarbonate supply portion.

TABLE 6

|  |  |  | Ex. 18 | Ex. 19 | Ex. 20 | Ex. 22 |
|---|---|---|---|---|---|---|
| characteristic properties of pellet | color | (Col b) | −0.2 | 0.1 | 0.3 | 0.2 |
|  | amount of phenol | (ppm) | 25 | 25 | 28 | 25 |
| CD molding results | releasability | fraction defective (%) | <1 | <1 | <1 | <1 |
|  | transferability |  | All satisfactory | All satisfactory | All satisfactory | All satisfactory |
|  | heat stability | color (YI) | 2.1 | 2.2 | 2.6 | 2.4 |
|  | wet heat stability | ΔMv | 100 | 100 | 150 | 150 |

Ex. Example
Notes:
(1) Pellets used for evaluation were sampled 200 hours after the start of production.
(2) The evaluation of transferability and wet heat stability out of CD molding results was made on the first 10 of 1,000 shots.

Example 23

Figure 2:
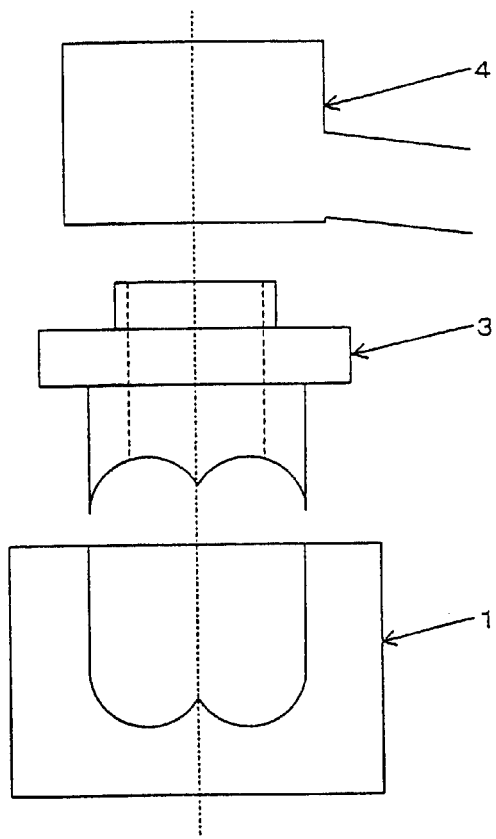
FIG. 2 is a diagram showing each part of the sectional view of FIG. 1.
Figure 3:
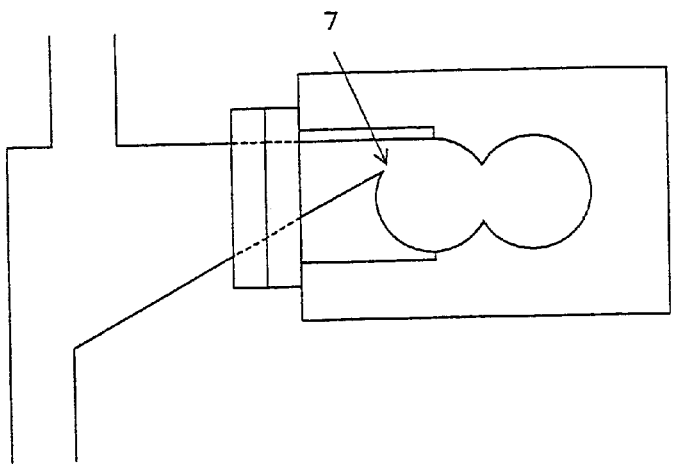
FIG. 3 is a sectional view in a direction perpendicular to the axial direction of a double-screw extruder of the vent section of an intermeshing double-screw extruder having a vent section of the present invention.

A polycarbonate was obtained in the same manner as in Example 1 except that a vent section having a structure shown in the sectional views of FIGS. 1 and 2 was installed right after each kneading section of the double-screw extruder in place of the vent section having a structure shown in the sectional views of FIGS. 3 to 6.

During 40 days of operation, the greatest number of foreign substances including gels and crystallized products contained in 1 kg of the polycarbonate final product was 100 or more. The greatest color b value of the pellet was 1.0.

Example 24

A polycarbonate was obtained in the same manner as in Example 23 except that the additive was trisnonylphenyl phosphite.

During 40 days of operation, the greatest number of foreign substances including gels, crystallized products and carbides contained in 1 kg of the polycarbonate final product was 100 or more. The greatest color b value of the pellet was 1.1.

Example 25

A polycarbonate was obtained in the same manner as in Example 23 except that the additive was trimethyl phosphate.

During 40 days of operation, the greatest number of foreign substances including gels, crystallized products and carbides contained in 1 kg of the polycarbonate final product was 100 or more. The greatest color b value of the pellet was 1.2.

Example 26

A polycarbonate was obtained in the same manner as in Example 23 except that the additive was tris(2,4-di-t-butylphenyl)phosphite.

During 40 days of operation, the greatest number of foreign substances including gels, crystallized products and carbides contained in 1 kg of the polycarbonate final product was 100 or more. The greatest color b value of the pellet was 1.1.

Example 27

A polycarbonate was obtained in the same manner as in Example 6 except that the position where the molten polycarbonate was supplied into the double-screw extruder was the upper portion of the other screw and not "the screw of the double-screw extruder having such a rotation direction that the supplied polycarbonate was first moved toward the side wall of the cylinder" and a position adjacent to the ends of the screws.

When the screw shaft was observed with the naked eye after 40 days of operation, the adhesion of a polycarbonate carbide to the surface of the shaft of the other screw not at the supply position was seen. Further, during operation, the greatest number of foreign substances which were mostly gels and carbides contained in 1 kg of the polycarbonate final product was 100 or more.

Example 28

A polycarbonate was obtained in the same manner as in Example 6 except that the position where the molten polycarbonate was supplied into the double-screw extruder was a position not adjacent to the end of the shaft (position 5 cm downstream from the end of the shaft).

When the screw shaft was observed with the naked eye after 40 days of operation, the adhesion of a polycarbonate carbide to the surface of the shaft of the screw on the upstream side of the supply position was seen. Further, during operation, the greatest number of foreign substances which were mostly gels and carbides contained in 1 kg of the polycarbonate final product was 100 or more.

Example 29

A polycarbonate was obtained in the same manner as in Example 6 except that a Teflon gland seal was used in the shaft sealing portion of the double-screw extruder and the temperature was set to 100° C.

When the screw shaft was observed with the naked eye after 40 days of operation, the adhesion of a polycarbonate crystallized product to the supply position was seen. Further, during operation, the greatest number of foreign substances which were mostly gels and crystallized products contained in 1 kg of the polycarbonate final product was 100 or more.

Example 30

The procedure of Example 12 was repeated except that nothing was added in the first to third treating zones. The conditions and results are shown in Tables 1 and 2.

Example 31

The procedure of Example 12 was repeated except that 0.003 part by weight of trisnonylphenyl phosphate heated at 100° C. was added as a phosphorus-based compound at normal pressure in the depressurizing section of the second treating zone in place of the kneading section. The conditions and results are shown in Tables 1 and 2.

Example 32

The procedure of Example 14 was repeated except that a cleaning fluid containing no sulfur compound was used. The results are shown in Table 4.

Example 33

The procedure of Example 17 was repeated except that a cleaning fluid containing no sulfur compound was used. The results are shown in Table 5.

As shown in the above examples, the above characteristic properties are closely related to one another and technical factors affecting these characteristic properties are entangled with one another. Therefore, to optimize a certain characteristic property, a certain technical factor must be optimized and to optimize these characteristic properties, technologies which take influences upon these characteristic properties into careful consideration must be combined. To this end, it is useful to combine the inventions of the above paragraphs 1 to 33, which falls within the scope of the present invention.

What is claimed is:

1. A resin production apparatus having a vacuum resin treating apparatus for treating a polycarbonate produced by melt polymerizing an aromatic dihydroxy compound and an aromatic carbonic acid diester in the presence of a polymerization catalyst, wherein an opening is formed in the side surface of a horizontal cylindrical vacuum resin treating apparatus such that the angle formed by a line connecting the center of the treating apparatus and the lowest position of the opening and a horizontal line passing through the center of the treating apparatus is located above the horizontal plane and between 0° and 85° and the angle formed by a line connecting the center of the treating apparatus and the highest position of the opening and a horizontal line passing through the center of the treating apparatus is located above the horizontal plane and between 5° to 90° within a section perpendicular to the axial direction of the treating apparatus, and wherein at least the lower portion of a vacuum suction pipe connected to the opening has a falling gradient and wherein when the rotation of a rotor blade in the horizontal cylindrical vacuum resin treating apparatus is observed from the outside in the opening formed in the side surface of the horizontal cylindrical vacuum resin treating apparatus, the rotation direction of a rotating shaft is selected such that the rotor blade rotates from the bottom to the top.

2. The production apparatus of claim 1, wherein the angle of the falling gradient from the horizontal plane is between 5° and 45°.

3. The production apparatus of claim 1, wherein part or all of the vacuum suction pipe is heated at a temperature at which the melt viscosity of the treated resin adhered to the vacuum suction pipe become 5,000 Pa·s or less.

4. The production apparatus of claim 3, wherein the horizontal cylindrical vacuum resin treating apparatus is an intermeshing double-screw extruder.

5. The production apparatus of claim 4, wherein the treatment of the horizontal cylindrical vacuum resin treating apparatus is the removal of volatile matter contained in the resin and/or the addition and mixing of an additive.

6. The production apparatus of claim 5, wherein the additive is selected from the group consisting of a phosphorus-based compound and a fatty acid ester.

7. The production apparatus of claim 6, wherein the removal of volatile matter is carried out by adding and kneading water with the resin and sucking the volatile matter under reduced pressure.

8. The production apparatus of claim 4, wherein the intermeshing double-screw extruder is unidirectionally rotary and a portion for supplying a polycarbonate in a molten state into the intermeshing double-screw extruder is located at the following position:

1) an above position of one of the screws of the double-screw extruder having such a rotation direction that the supplied polycarbonate is first moved toward the side wall of a cylinder, and 2) a position adjacent to the end of a shaft.

9. The production apparatus of claim 8, wherein the shaft sealing portion of the screw shaft of the extruder is made from a material having a heat resistance of 250° C. or more and the agitation unit of a portion where the molten polycarbonate is supplied is a full flight unit.

10. The production apparatus of claim 8, wherein the shaft sealing portion of the screw shaft of the extruder is made from a material having a heat resistance of 250° C. or more, the number of agitation units of a portion where the molten polycarbonate is supplied is one or more, and a unit selected from the group consisting of a forward kneading unit, back kneading unit and neutral kneading unit is installed on the shaft end side.

11. A resin production method, which comprises supplying a polycarbonate into the vacuum resin treating apparatus of the resin production apparatus of claim 1 without being solidified.

12. The resin production method of claim 11, wherein the horizontal cylindrical vacuum resin treating apparatus is an intermeshing double-screw extruder.

13. The resin production method of claim 12, wherein the treatment of the horizontal cylindrical vacuum resin treating apparatus is the removal of volatile matter contained in the resin and/or the addition and mixing of an additive, and the removal of volatile matter is carried out by adding and kneading water with the resin and sucking the volatile matter under reduced pressure.

14. The resin production method of claim 12, wherein the treatment of the horizontal cylindrical vacuum resin treating apparatus is the removal of volatile matter contained in the resin and/or the addition and mixing of an additive, and the additive is selected from the group consisting of a phosphorus-based compound and a fatty acid ester.

15. The resin production method of claim 14, wherein the removal of volatile matter is carried out by adding and kneading water with the resin and sucking the volatile matter under reduced pressure.

16. The resin production method of claim 15, wherein the removal of volatile matter is carried out by adding and kneading water with the molten polycarbonate in an amount of 0.1 to 20 wt % based on the polycarbonate at a temperature of 200 to 350° C. and a pressure of 0.3 MPa or more and sucking the volatile matter at a vent section pressure of $1.013 \times 10^5$ Pa (760 mmHg) or less.

17. A resin production method, which comprises adding and mixing an additive selected from the group consisting of a phosphorus-based compound and a fatty acid ester to the polycarbonate in the horizontal cylindrical vacuum resin treating apparatus of the resin production apparatus of claim 1.

18. A resin production method, which comprises removing volatile matter from the polycarbonate in the horizontal cylindrical vacuum resin treating apparatus of the resin production apparatus of claim 1.

19. The production method of claim 18, wherein the removal of volatile matter is carried out by adding and kneading water with the polycarbonate and sucking the volatile matter under reduced pressure.

20. The production method of claim 19, wherein the removal of volatile matter is carried out by adding and kneading water with the molten polycarbonate in an amount of 0.1 to 20 wt % based on the polycarbonate at a temperature of 200 to 350° C. and a pressure of 0.3 MPa or more and sucking the volatile matter at a vent section pressure of $1.013 \times 10^5$ Pa (760 mmHg) or less.

21. A polycarbonate continuous production method of claim 11, comprising the steps of:

melt polycondensing an aromatic dihydroxy compound and 1.00 to 1.1 mol of a carbonic acid diester based on 1 mol of the aromatic dihydroxy compound in the presence of $10^{-8}$ to $5 \times 10^{-5}$ equivalent of an alkali metal compound and/or alkali earth metal compound based on 1 mol of the aromatic dihydroxy compound; and adding (A) 0.00001 to 0.01 part by weight, based on 100 parts by weight of the polycarbonate, of a sulfonic acid compound represented by the following formula (1):

$$A^1\text{—}SO^3X^1 \qquad (1)$$

wherein $A^1$ is a hydrocarbon group having 1 to 20 carbon atoms which may have a substituent and $X^1$ is an ammonium cation or phosphonium cation, and/or (B) 0.0001 to 0.1 part by weight, based on 100 parts by weight of the polycarbonate, of a phosphorus-based compound, and/or (C) 0.0005 to 0.3 part by weight, based on 100 parts by weight of the polycarbonate, of a partial ester between an aliphatic carboxylic acid and a polyhydric alcohol as a mixture or separate liquid products while the polycarbonate which is the reaction product is molten to the pressurized portions of the vacuum resin treating apparatus which is a double-screw extruder at the same time or separately.

22. The polycarbonate continuous production method of claim 21, wherein the liquid products are added under the condition that the pressure of any one of the portions to which the liquid products are added of the double-screw extruder is 2 kg/cm² or more.

23. The polycarbonate continuous production method of claim 22, wherein any one of the addition portions of the double-screw extruder has a resin filling rate of 50% or more.

24. The polycarbonate continuous production method of claim 23, wherein the double-screw extruder is a multi-stage vented double-screw extruder and has at least one unit treating zone consisting of a kneading section, sealing section and depressurizing section, and the liquid products are added to at least one of the kneading sections.

25. The polycarbonate continuous production method of claim 24, wherein the sulfonic acid compound is a sulfonic acid phosphonium salt represented by the following formula (1)-1:

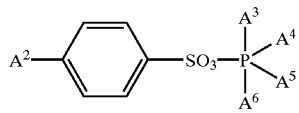

(1)-1 wherein $A^2$, $A^3$, $A^4$, $A^5$ and $A^6$ are each independently a monovalent hydrocarbon group having 1 to 20 carbon atoms.

26. The polycarbonate continuous production method of claim 25, wherein an aromatic phosphorous acid ester compound is used as the phosphorus-based compound.

27. The polycarbonate continuous production method of claim 26, wherein a melt polycondensation reaction is carried out in the presence of $1\times10^{-5}$ to $5\times10^{-3}$ equivalent of a nitrogen-containing basic compound based on 1 mol of an aromatic dihydroxy compound together with an alkali metal compound and/or alkali earth metal compound.

28. A method of cleaning a polycarbonate production apparatus, which comprises cleaning the inner surface of the resin production apparatus of claim 1 with a cleaning fluid containing a sulfur compound partially or wholly.

29. The method of claim 28, wherein the sulfur compound is at least one member selected from the group consisting of thiols, thioethers, thiocyanates, isothiocyanates, thioesters, thioureas, thiocarbonates and disulfides.

* * * * *